United States Patent [19]
Rudolph

[11] Patent Number: 5,529,263
[45] Date of Patent: Jun. 25, 1996

[54] SUPERSONIC AIRPLANE WITH SUBSONIC BOOST ENGINE MEANS AND METHOD OF OPERATING THE SAME

[75] Inventor: Peter K. C. Rudolph, Seattle, Wash.

[73] Assignee: The Boeing Company, Seattle, Wash.

[21] Appl. No.: 377,646

[22] Filed: Jan. 25, 1995

Related U.S. Application Data

[63] Continuation-in-part of Ser. No. 214,661, Mar. 17, 1994, abandoned, which is a continuation of Ser. No. 964,530, Oct. 21, 1992, abandoned.

[51] Int. Cl.⁶ .................................................. B64D 27/00
[52] U.S. Cl. .............................. 244/55; 244/15; 244/58
[58] Field of Search ................................ 244/15, 55, 54, 244/53 R, 73 R, 74, 56; 60/270.1, 226.1

[56] References Cited

U.S. PATENT DOCUMENTS

| | | | |
|---|---|---|---|
| 3,060,685 | 10/1962 | Tonnier et al. | 244/55 |
| 3,084,888 | 4/1963 | Hertel | 244/55 |
| 3,109,610 | 11/1963 | Queurler et al. | 244/5 R |
| 3,146,971 | 9/1964 | Walker et al. | 244/55 |
| 3,188,025 | 6/1965 | Moorehead | 244/55 |
| 3,215,369 | 11/1965 | Johnson | 244/56 |
| 3,324,660 | 6/1967 | Lave et al. | 244/74 R |
| 3,489,377 | 1/1970 | Pearson et al. | 244/50 |
| 4,411,399 | 10/1983 | Hapke | 244/55 |
| 4,456,204 | 6/1984 | Hapke | 244/55 |

FOREIGN PATENT DOCUMENTS

| | | | |
|---|---|---|---|
| 764684 | 1/1957 | United Kingdom | 244/55 |
| 851916 | 10/1960 | United Kingdom | 244/15 |

OTHER PUBLICATIONS

Aircraft Engineering Nov. 1964 p. 369.

*Primary Examiner*—Galen L. Barefoot
*Attorney, Agent, or Firm*—Hughes, Multer & Schacht

[57] ABSTRACT

A supersonic airplane having four or two supersonic engines and one or more boost engines. During take-off and initial climb the supersonic engines are operated at a lower thrust setting within acceptable noise limits, and the subsonic engine(s) is operated to provide boost thrust to enable the airplane to operate a take-off and climb. During cruise, the subsonic engines are in a nonoperating mode, and the supersonic engines alone provide the thrust for supersonic operation. In one embodiment, one subsonic engine is deployed on one side of the fuselage during the operating mode. In a second embodiment, there are two subsonic engines deployed on opposite sides of the fuselage. In another embodiment, a single subsonic engine is installed inside the fuselage.

34 Claims, 13 Drawing Sheets

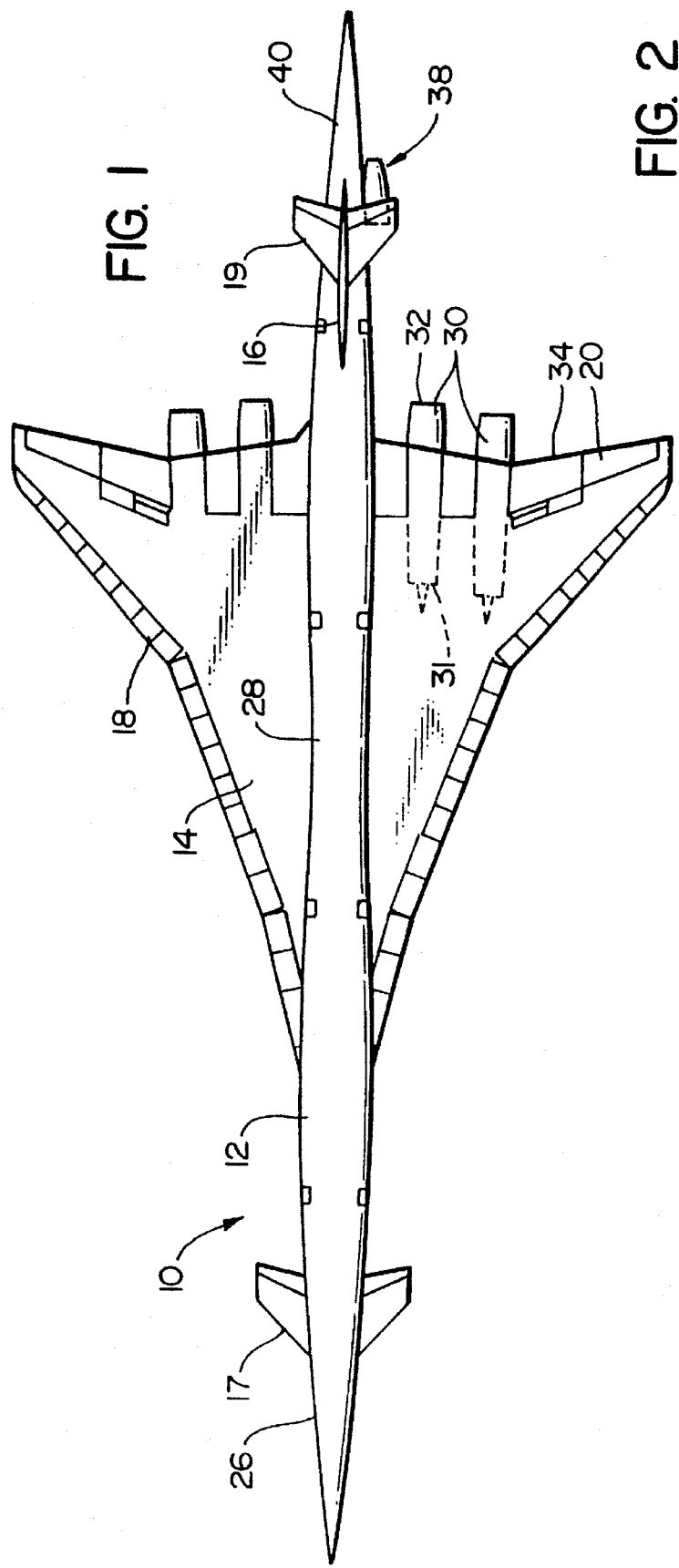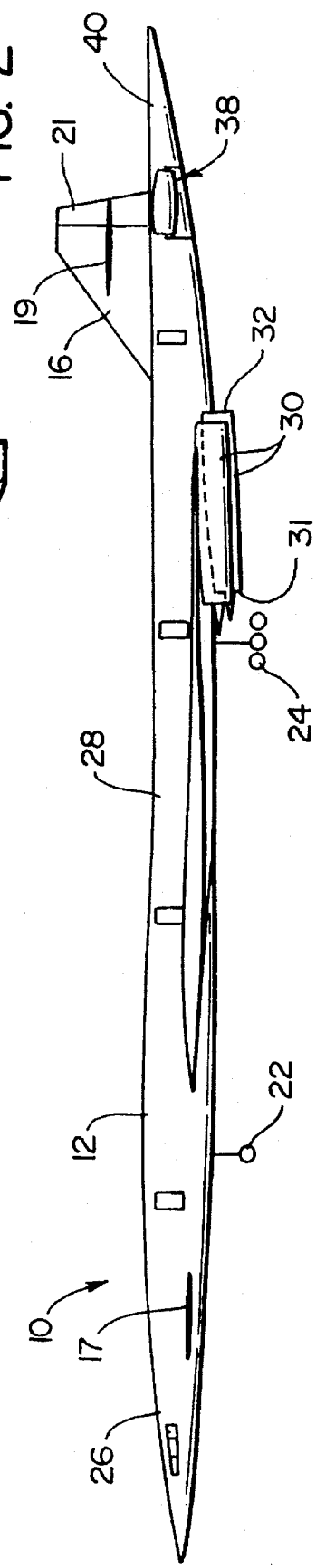

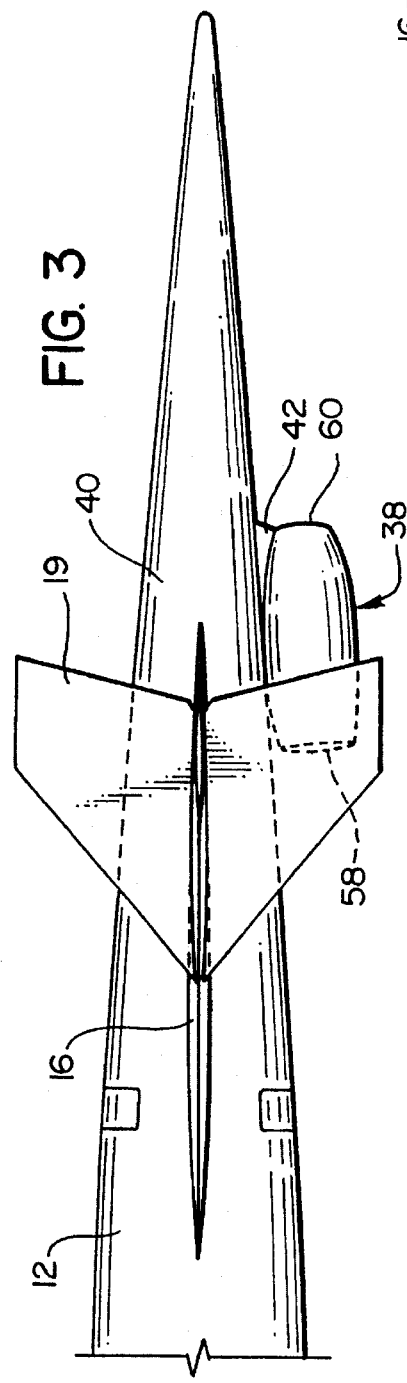
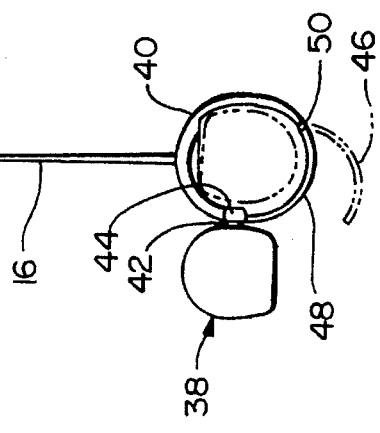
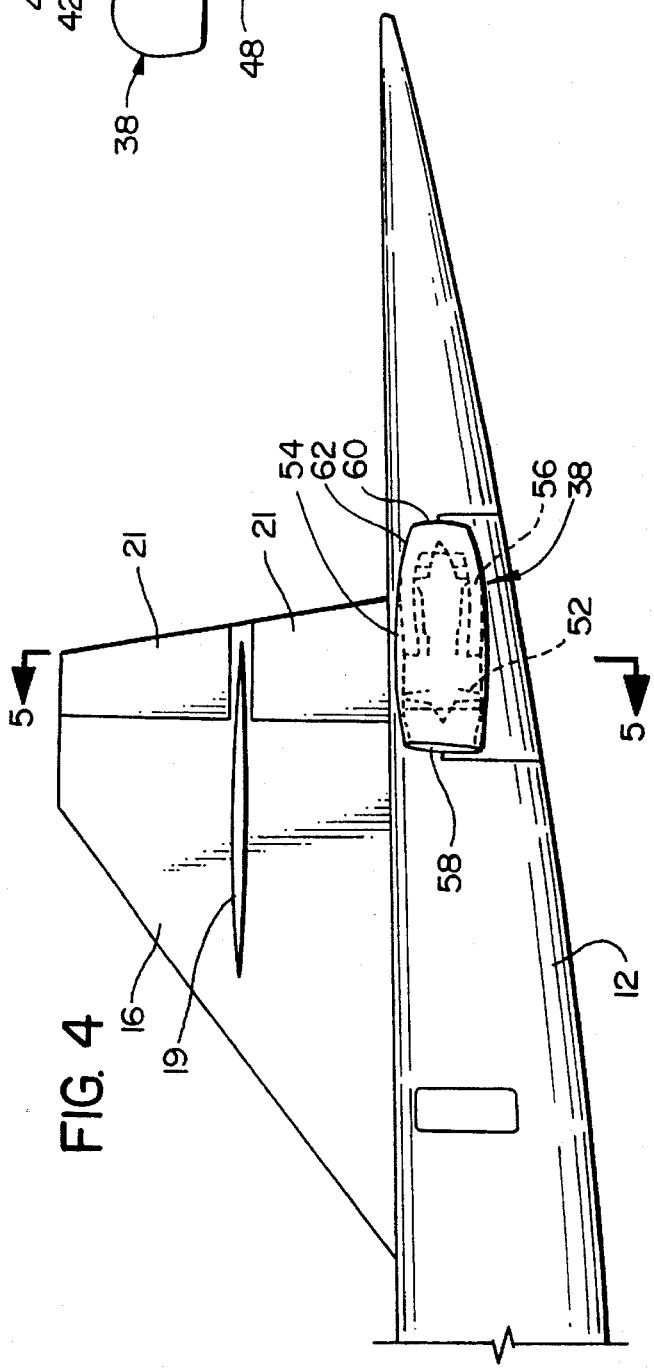

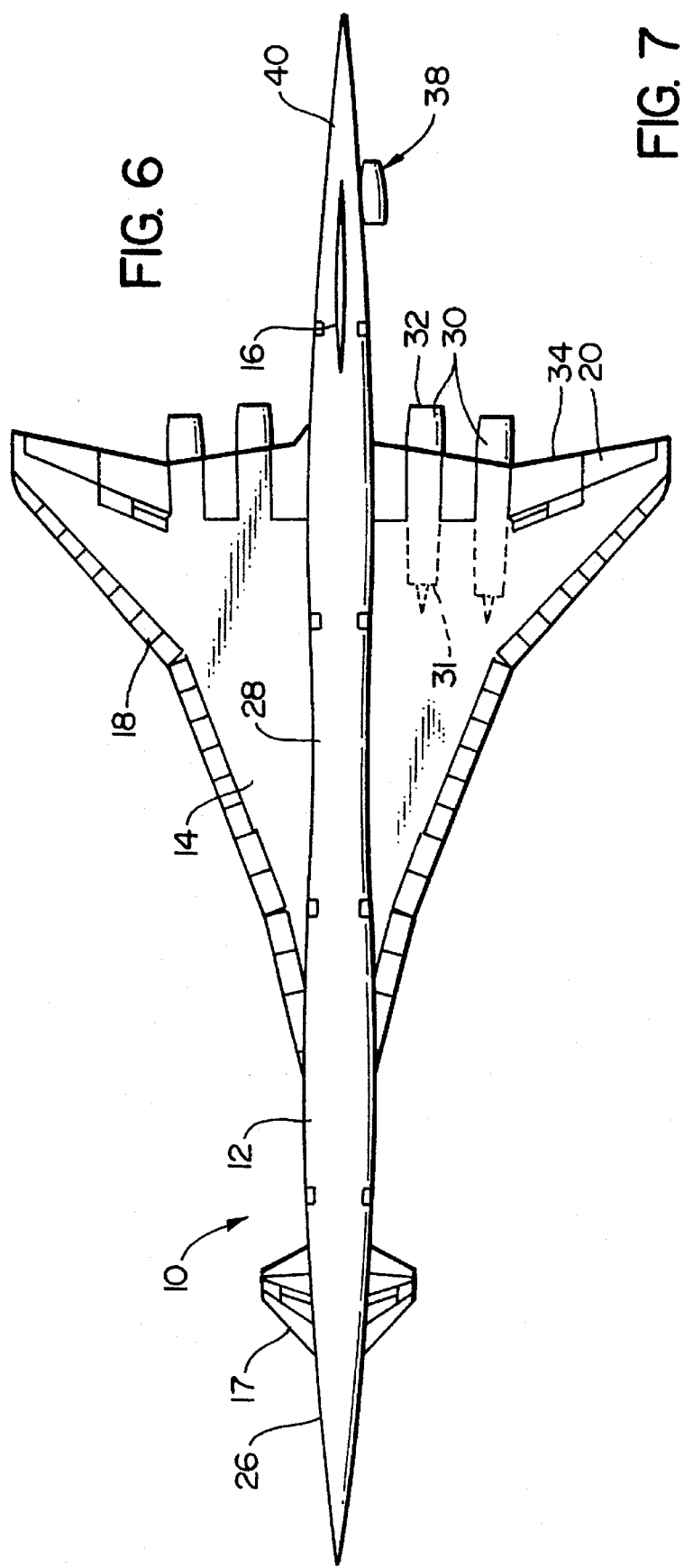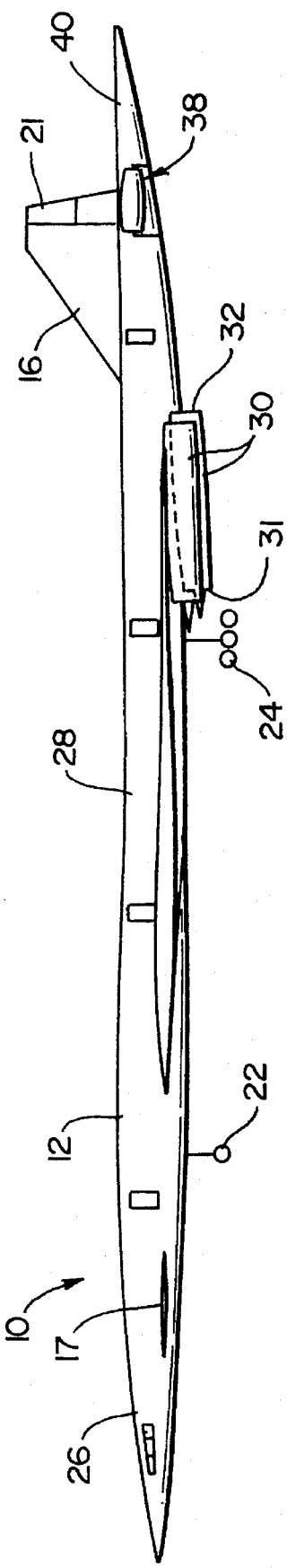

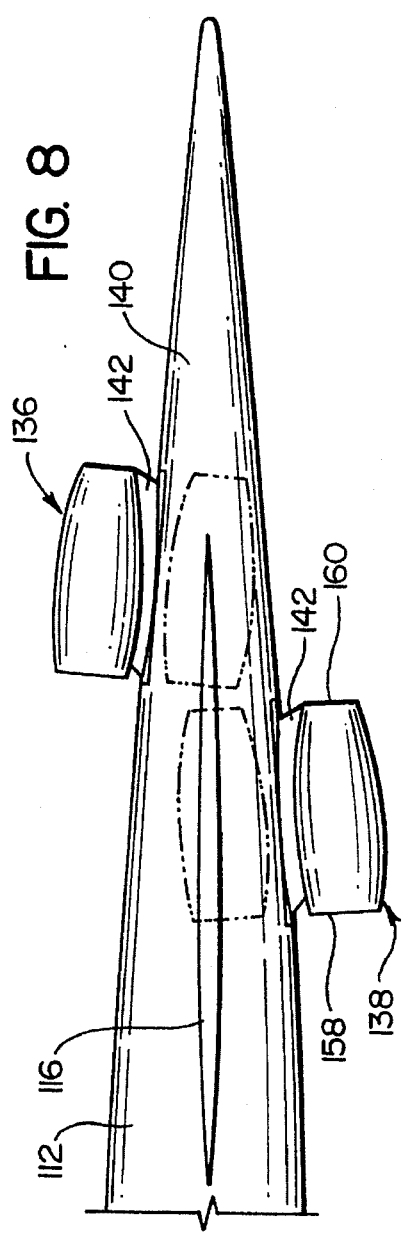
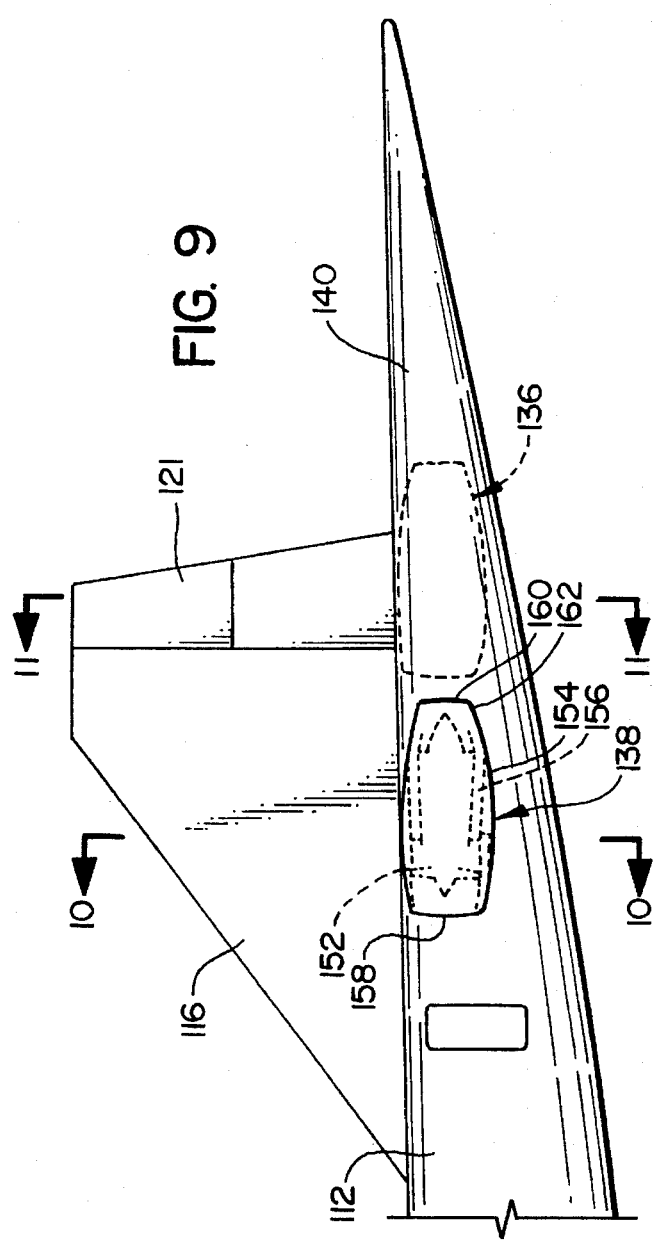
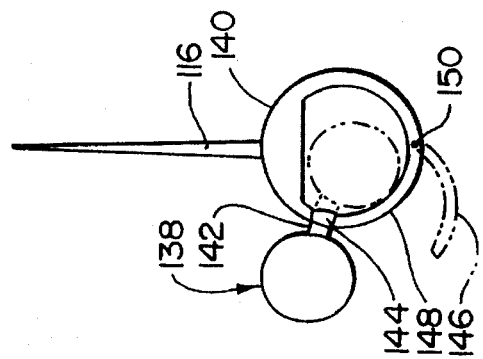
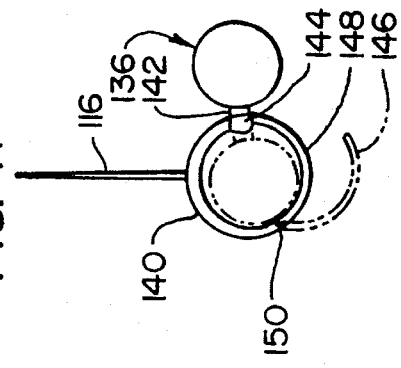

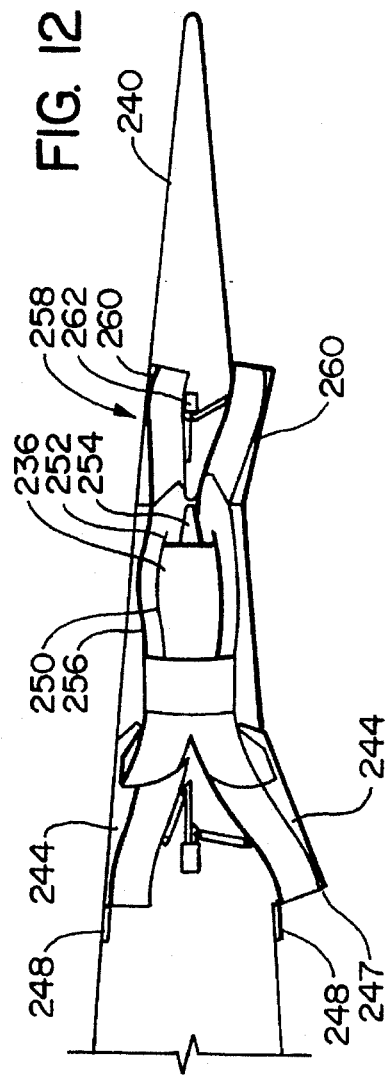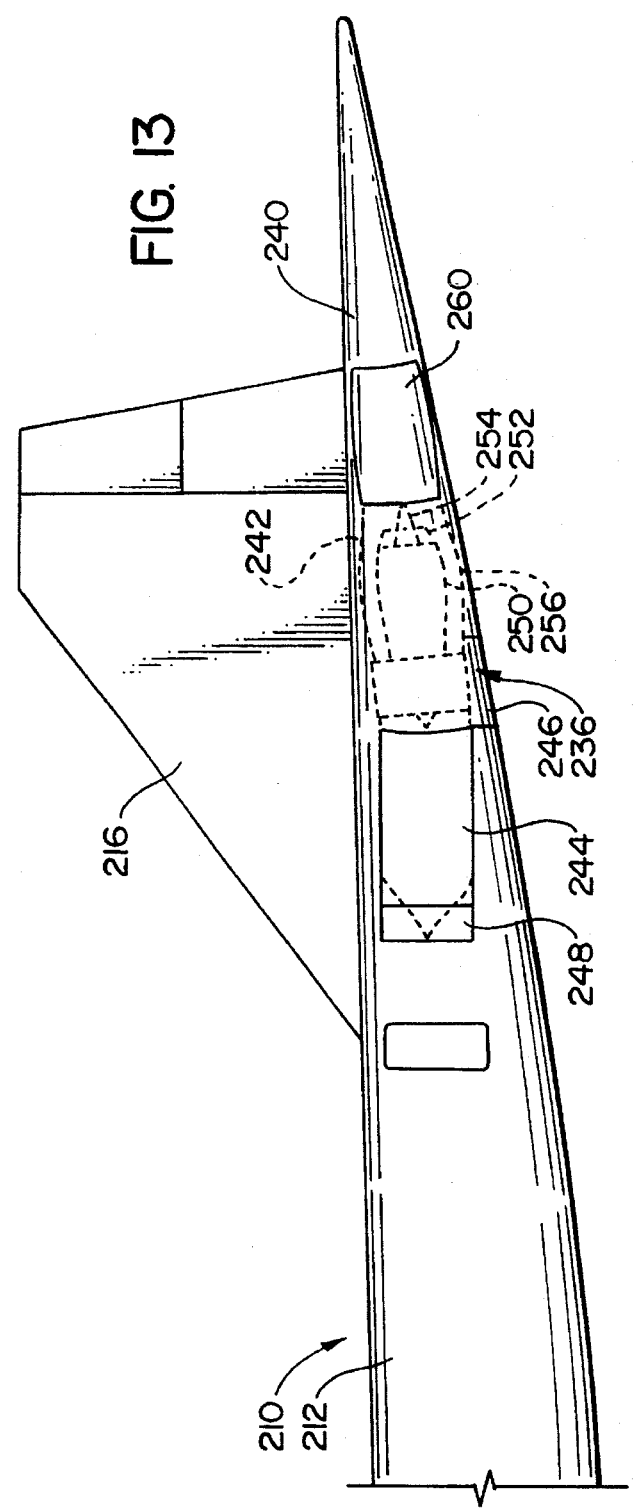

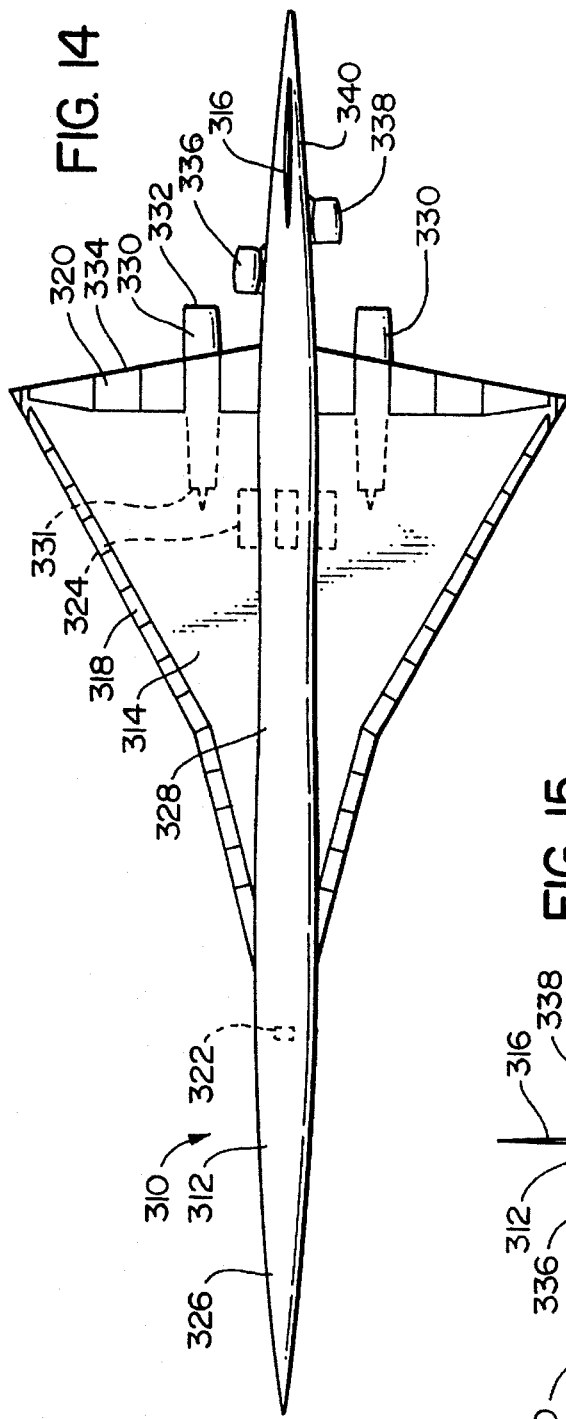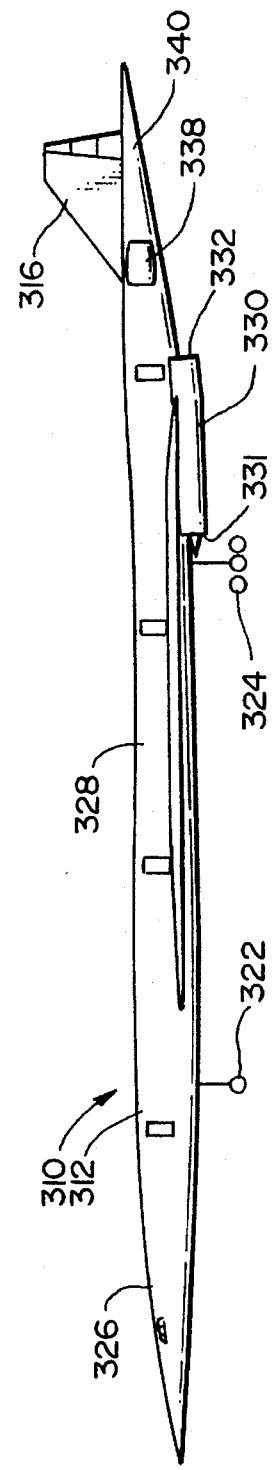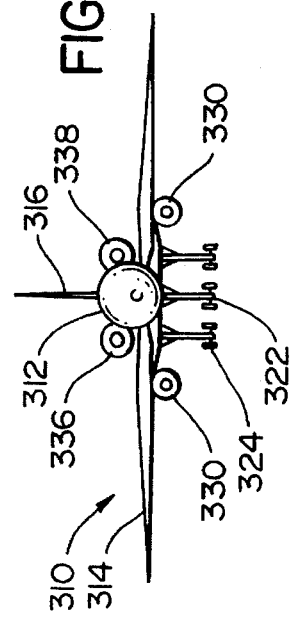

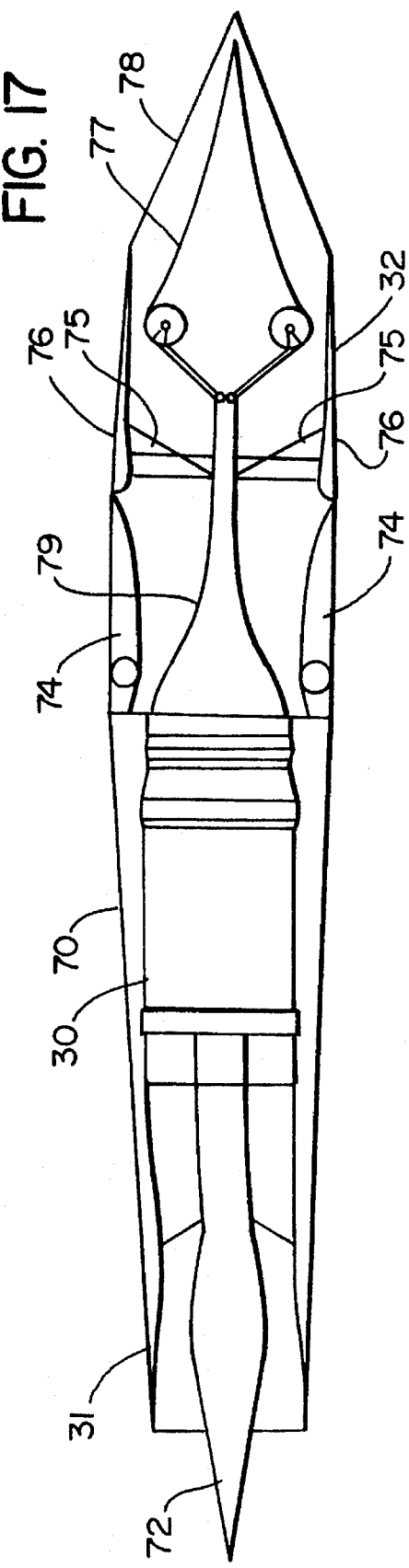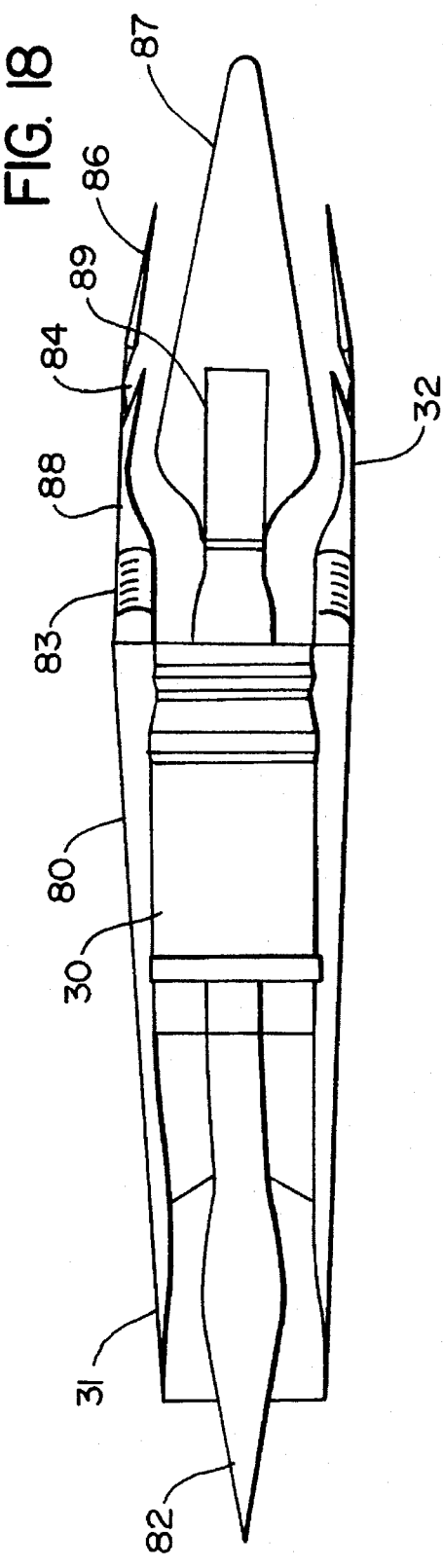

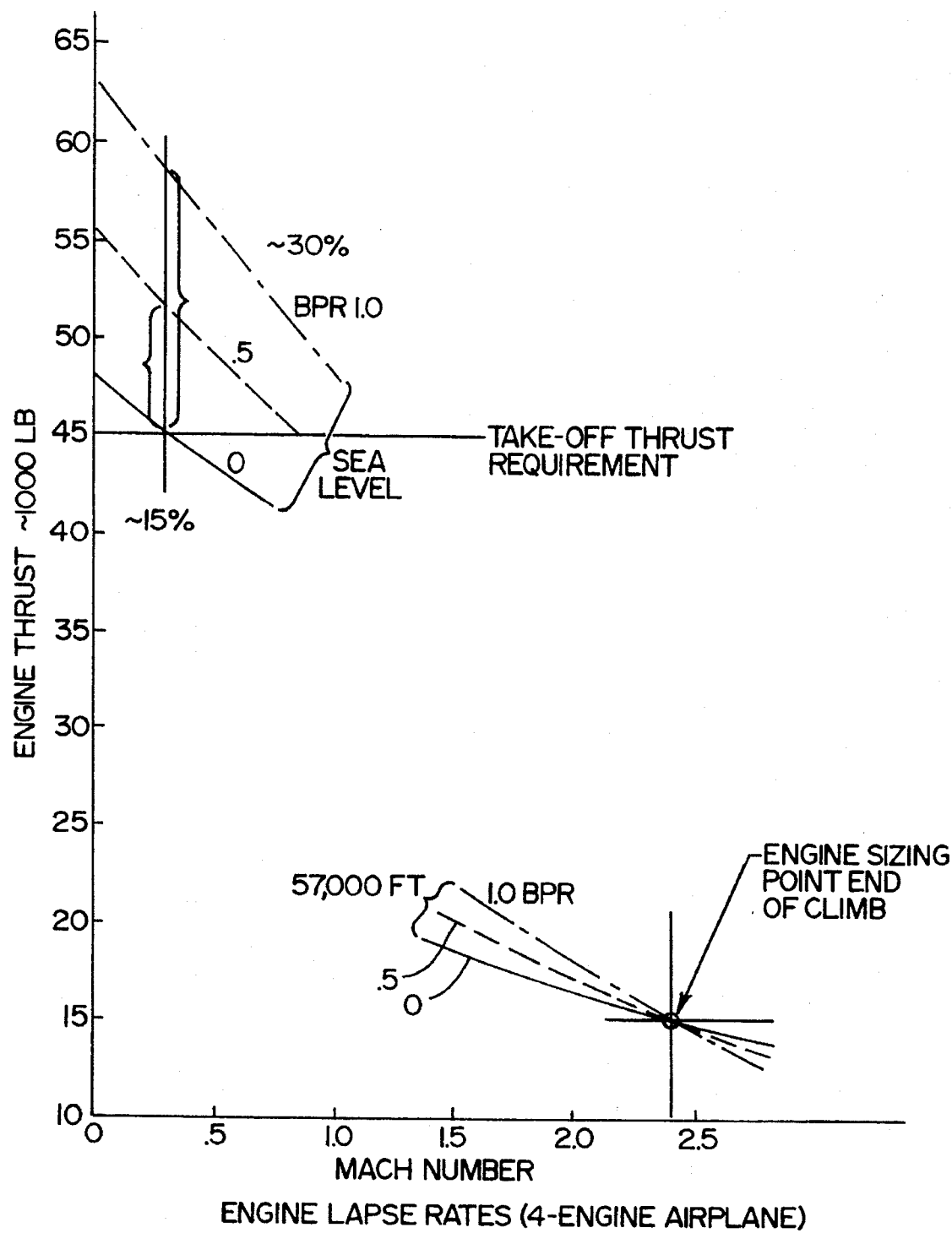
ENGINE LAPSE RATES (4-ENGINE AIRPLANE)

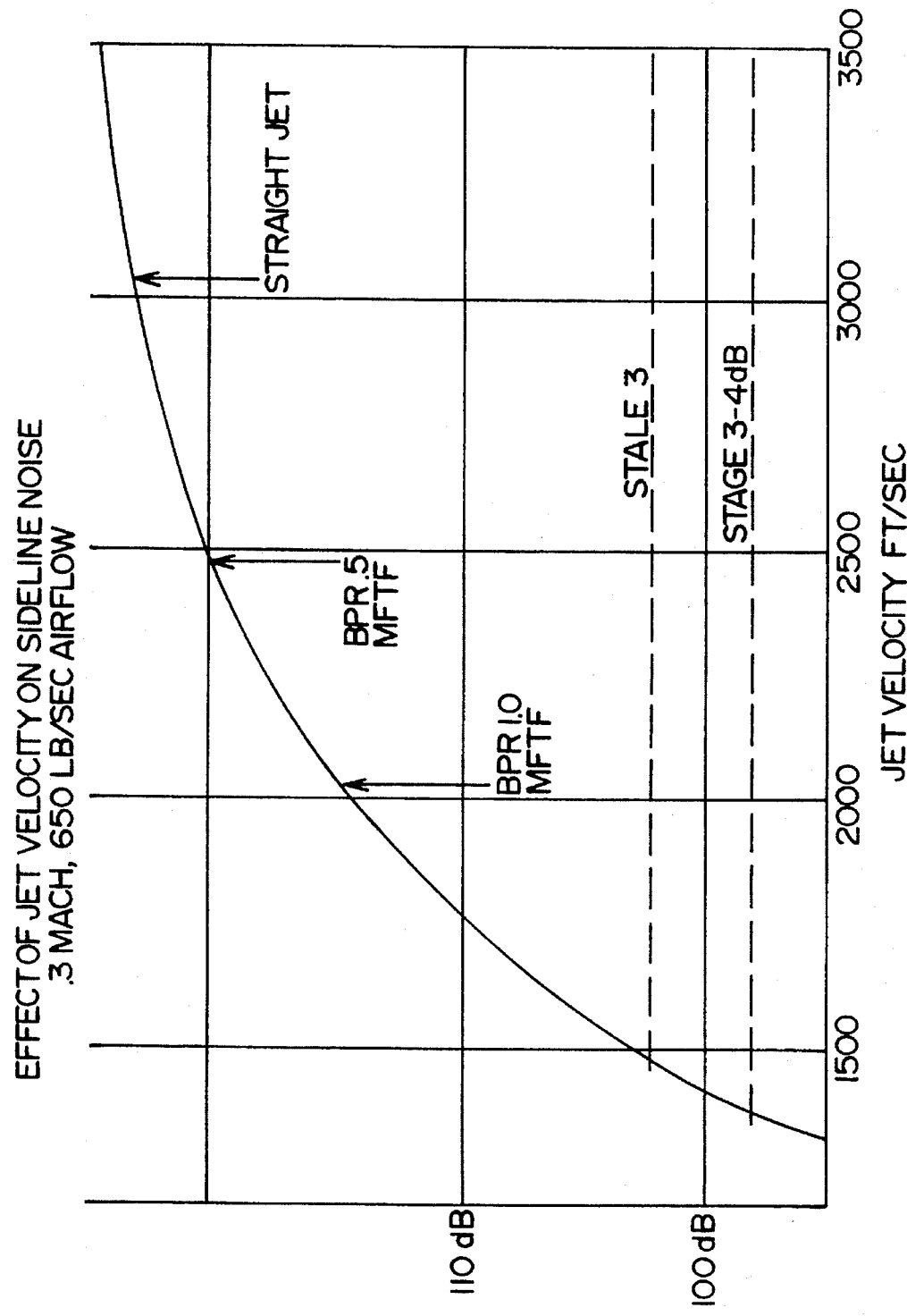

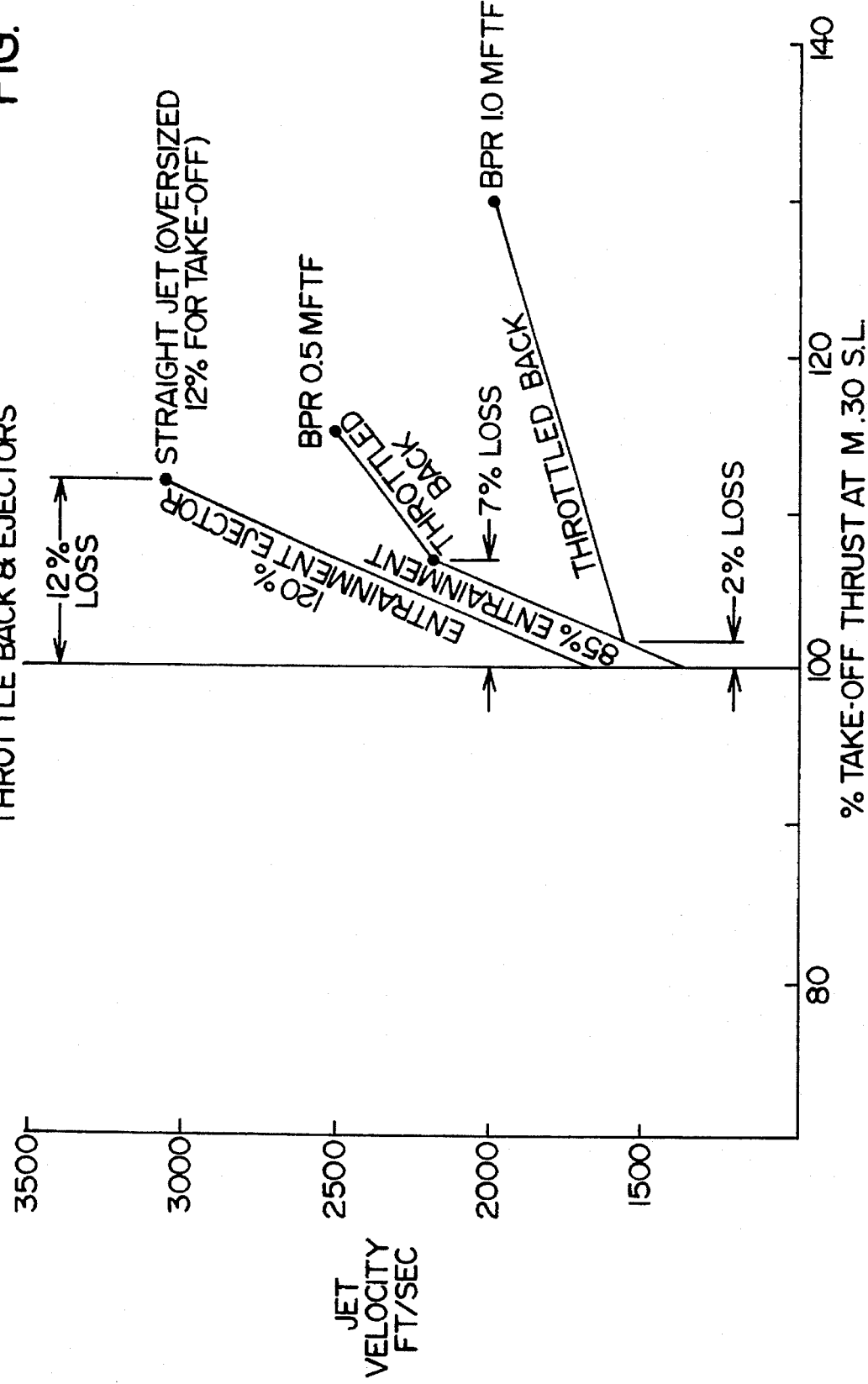

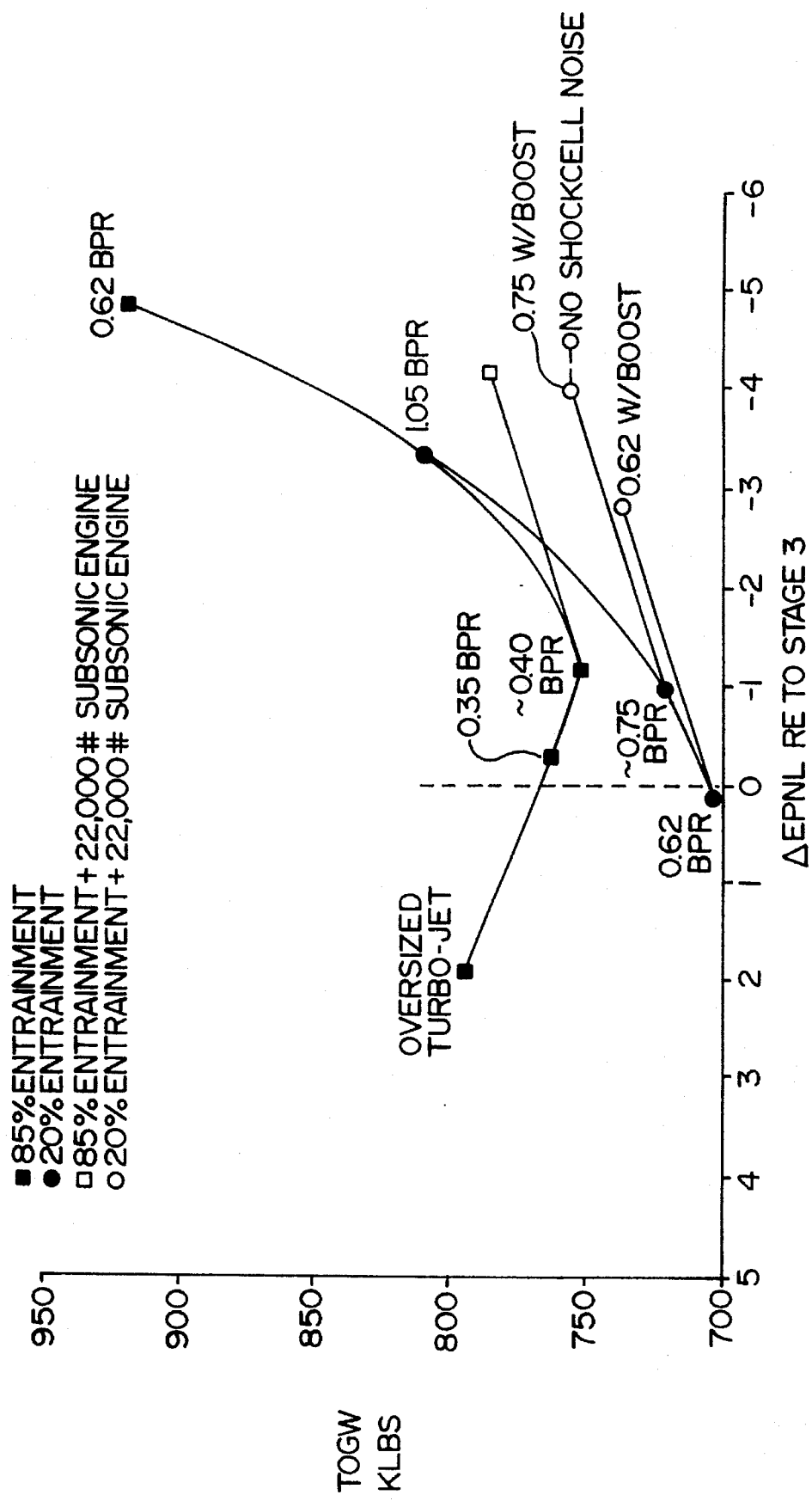

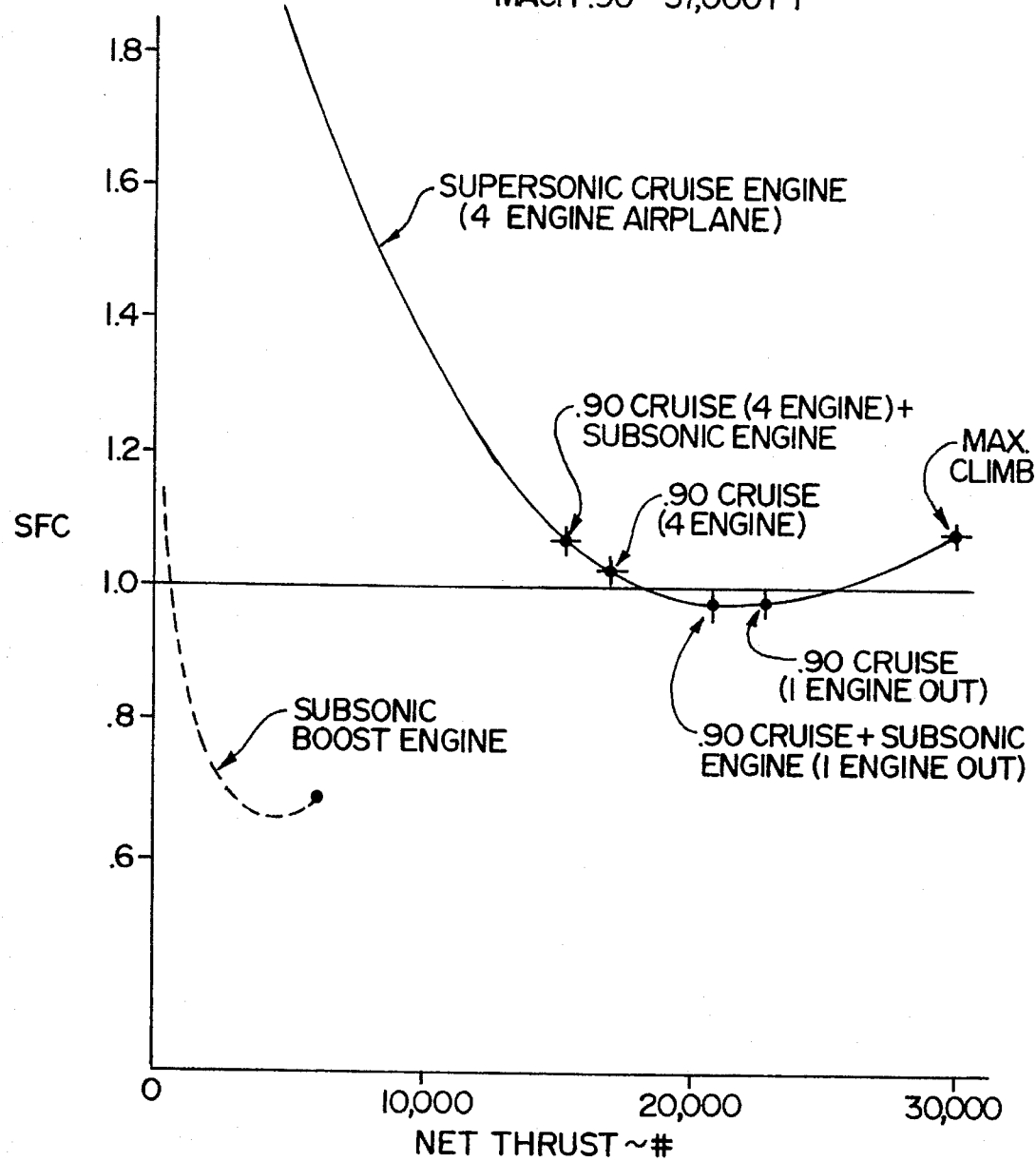

ures, etc. A search of the patent
SUPERSONIC AIRPLANE WITH SUBSONIC BOOST ENGINE MEANS AND METHOD OF OPERATING THE SAME

CROSS REFERENCE TO RELATED APPLICATIONS

This application is a continuation-in-part of U.S. patent application Ser. No. 08/214,661, filed Mar. 17, 1994, which in turn is a continuation of U.S. patent applciation Ser. No. 07/964,530, filed Oct. 21, 1992 (both now abandoned.)

BACKGROUND OF THE INVENTION

A. Field of the invention

The present invention relates generally to a supersonic airplane and method of operating the same, and more particularly to such an airplane and method where the propulsion system incorporates not only supersonic engines, but also a subsonic auxiliary engine or engines.

B. Background Art

A very critical factor in designing an environmentally acceptable supersonic commercial airplane is the problem of jet noise during take-off, climb, and landing. Subsonic fan jet engines having a high bypass ratio and low jet velocities are able to operate quietly. Supersonic aircraft which are generally powered by straight jet engines, operate with much higher jet exhaust velocities. High velocity jets emit high levels of low frequency jet mixing noise, which is generated outside and downstream of the engine nacelle and which therefore cannot be attenuated with internal treatment. Even if the supersonic engine is designed as a fan jet engine, the bypass ratios are generally relatively low (i.e. 0.5 to 1.0), with moderately lower jet velocities than a straight jet and the effect on alleviating jet noise is not sufficient to meet noise limits required in the future.

Over the last several decades, there have been various approaches to alleviating jet noise in supersonic airplanes. For example, there are various devices for mixing ambient air with the jet exhaust during operating modes where noise alleviation is required. Acoustic panels are used to attenuate the mixing noise generated inside this device, generally referred to as an ejector.

The ambient air utilized to mix with the jet exhaust, may be introduced through blow-in doors in the aft portion of the engine nacelle or by means of an oversized main inlet. The acoustic panels inside the ejector may either be fixed or designed to fold away in cruise.

However, proposals such as these pose various problems. For example, there is the problem of thrust losses at low speed and cruise. Further, the flat sided moving parts utilized for mixing noise suppression must be designed so that they will hold up in high temperature and high noise level environments. Also, there is the problem of incorporating thrust reversers that will operate reliably in a high temperature environment.

While these problems may be overcome through proper design and material selection, there is one remaining problem that seems to be extremely difficult to solve (if not insurmountable) using designs and concepts presently in the prior art or under consideration. This problem is that when attenuating jet noise generated by straight jet engines or low bypass ratio engines by means of ejectors, to meet today's Federal Aviation Agency (FAA) noise rules (Stage 3) or a future more stringent rule (Stage 4). The penalties resulting from the ejector (weight, nacelle drag and higher specific fuel consumption) deteriorate the airplane performance to the point where it becomes economically unattractive.

Another current approach is to provide a variable cycle engine which operates as a straight jet in cruise. At low speed a diverter valve located between the first and second compressor stages switches the first compressor stage out of the main engine cycle and into a parallel single stage fan. The variable geometry to accomplish this conversion would require a diverter valve, a stowaway inlet and a retractable fan exhaust nozzle. This poses some very significant design challenges. Also, even if these are overcome, and even though this bypass engine would have a noise problem of somewhat smaller magnitude, there may still be requirements for additional jet noise reduction.

To turn our attention to some other facets of aircraft design that are largely unrelated to the problems of noise abatement in supersonic aircraft, there have been various proposals involving aircraft engines, such as providing auxiliary engines, boost engines, various arrangements of engine inlets and exhaust, etc. A search of the patent literature has disclosed a number of these proposals, these being presented below:

U.S. Pat. No. 2,506,976 (Tharratt) shows an aircraft having jet assisting rockets mounted in the fuselage. Hinged panels are provided in a manner to enable the rockets to be carried, with these panels providing an aerodynamically clean design when in the closed position.

U.S. Pat. No. 3,084,888 (Hertel et al) discloses a VSTOL aircraft having engines which can be stowed in the fuselage and then deployed outside of the fuselage for providing vertical thrust.

U.S. Pat. No. 3,109,610 (Quenzler et al) shows a jet engine mounted within the fuselage. There is an intake position at the lower portion of the fuselage.

U.S. Pat. No. 3,134,561 (Clejan) shows a propeller-driven single-engine aircraft where there is a second emergency engine such as a pulse engine that is carried with the aircraft and deployed when needed, such as when a main engine fails.

U.S. Pat. No. 3,188,025 (Moorehead) shows a supersonic aircraft where there is a pair of aft-mounted engines on opposite sides of the fuselage. As shown on FIG. 3, these can be deployed in an upper position for takeoff and moved to a lower position for supersonic flight.

U.S. Pat. No. 3,302,907 (Wilde, et al), discloses an aircraft adapted to take-off and land vertically. There are engines which are mounted within the fuselage and which can be moved outwardly from the fuselage into an operation position.

U.S. Pat. No. 3,383,074 (Coplin) shows a VTOL aircraft where auxiliary engines can be deployed in the aircraft and then swung outwardly in a deployed position to provide vertical thrust.

U.S. Pat. No. 3,454,241 (Riemerschmid) shows a VTOL aircraft where the engines on each side of the aircraft can be swung out of the fuselage and directed downwardly for vertical thrust. The engines can also be moved to a more horizontally directed position.

U.S. Pat. No. 3,489,377 (Pearson et al) shows an aircraft having two main forward propulsion engines and an auxiliary engine which is capable of operating in two modes. First, it can simply produce thrust. Alternatively, it can produce shaft power for driving aircraft services. To produce thrust in flight, the auxiliary engine is provided with a straight exhaust. But on the ground, the exhaust is deflected to minimize noise. There is a split air inlet in the form of side of the body louvered inlet members which can be closed for flight operation.

U.S. Pat. No. 3,645,476 (Haberkorn) discloses a V/Stol where fans for the engines are stowed within the aircraft in one mode and have a position extending outwardly from the aircraft in an operating mode.

U.S. Pat. No. 4,130,258 (Fox) shows an aircraft with a retractable auxiliary engine. This auxiliary engine is normally stowed within the aircraft and then moved downwardly in a deployed position if one of the regular engines is not working properly.

U.S. Pat. No. 4,411,399 (Hapke) discloses a retractable nozzle faring system for a center boost engine. This fairing system is able to be configured aerodynamically so as to reduce the diameter of the outlet to minimize drag, and can be expanded to operate as an exhaust nozzle for a selectively operable center boost engine.

U.S. Pat. No. 4,456,204 (Hapke) discloses an aircraft where there is an engine inlet at the leading edge of a vertical stabilizer at the tail section, this leading into a center boost engine. The engine inlet can be open or closed under conditions where the center engine is operative or nonoperative, respectively. The center boost engine would commonly be used during take-off, air re-fueling operations, and/or certain emergency operating conditions.

U.S. Pat. No. 4,717,095 (Cohen et al) shows a turbine driven power unit which is carried in the air frame, and then deployed into an operating position outside of the air frame when needed.

German patent 2,720,957 shows a glider having engines that are mounted in the fuselage for the glide mode and can be pivoted outwardly into the airstream for powered flight.

An article in Aircraft Engineering, dated November, 1984 at page 369 discloses the concept of using a booster engine installation where the air inlets are on opposite sides of the fuselage, and the booster engine is positioned in the aft end of the fuselage to discharge the exhaust directly rearwardly.

SUMMARY OF THE INVENTION

The airplane of the present invention is a supersonic airplane designed to be able to fly at supersonic speed and develop adequate thrust for supersonic flight. The airplane is also able to develop adequate thrust to take off and climb in a manner that the noise level is no greater than a predetermined noise level, which in the preferred form would be no greater than the noise levels which are currently being mandated and which in the future are expected to be mandated by the U.S. government and possibly other governmental agencies.

The airplane comprises an aircraft structure capable of operating at supersonic cruise. There is supersonic engine means mounted to the aircraft structure and characterized in that the supersonic engine means is capable of generating the thrust for supersonic cruise so as to be able to maintain supersonic cruise. Also, the supersonic engine means is characterized in that with the supersonic engine means operating to develop the thrust adequate for take-off and climb, this results in a noise level greater than the predetermined noise level. However, the supersonic engine means is capable of operating at a relatively lesser power setting at a noise level no greater than the predetermined noise level, but at a lower power setting developing a lower thrust that is below the required take-off and climb thrust.

There is provided subsonic engine means having a first nonoperating mode and a second operating mode where the subsonic engine means is capable of providing a boost thrust during take-off and climb that is at least equal to the difference between the take-off and climb thrust and the lower thrust developed by the supersonic engine means when operating at a noise level no greater than the predetermined noise level.

Thus, the airplane is capable of operating through take-off and climb and yet be within the predetermined noise level by operating the supersonic engine means at the lower thrust, and also operating the subsonic engine means to develop the boost thrust. Further, the airplane is capable of supersonic operation by having the subsonic engine means in the nonoperating mode and operating the supersonic engine means to develop the adequate thrust for supersonic flight.

The subsonic engine means comprises at least one subsonic engine.

In one form, the subsonic engine means is mounted to be stowed within the aircraft structure during the nonoperating mode and to be deployed outside the aircraft structure during the second operating mode. In this configuration, the subsonic engine means desirably comprises one or two subsonic engines. Further, in the preferred configuration where the airplane comprises a wing and a fuselage, and has two subsonic engines, the engines are mounted in the deployed position on opposite sides of the fuselage. Also, preferably, the supersonic engines have thrust reverser means capable of creating adequate reverse thrust for stopping of the airplane.

In another configuration, a subsonic engine means is positioned within the aircraft structure during both the first and second modes. During the second operating mode, inlet means for the subsonic engine means is positioned at an air intake position, and exhaust nozzle means of the subsonic engine means is arranged to discharge engine exhaust outwardly of said aircraft structure to develop thrust.

In the preferred design, the supersonic engine means has a characteristic operating curve of specific fuel consumption relative to engine thrust. The supersonic engine means is designed to have specific fuel consumption optimized for supersonic cruise and adequate thrust to maintain supersonic cruise. Thus, the supersonic engine means is operating at relatively lower efficiency at subsonic cruise, and at relatively even less efficiency at the power settings during take-off and initial climb.

Also, in a preferred form, the airplane comprises a fuselage and a delta wing. With the supersonic engine means comprising two or four supersonic engines mounted adjacent to the delta wing on opposite sides of the fuselage. The subsonic engine means is mounted at the aft end of the fuselage in this arrangement.

The supersonic means is constructed and arranged to produce engine exhaust and to operate at least during takeoff and climb with ambient air intake means to provide secondary air directed into the supersonic engine means to mix with the engine exhaust to provide a mixed exhaust of engine exhaust and secondary air. The secondary air during takeoff and climb mode in the preferred form has a mass flow rate to mass flow rate of the engine exhaust where the ratio of the mass flow rate of the secondary air to the engine exhaust is at least as great as 4 over 5 and more desirably 1 over 1, and desirably no greater than 6 over 5.

In the preferred form, the supersonic engine means comprises bypass engine means which provides bypass air to mix with the engine exhaust, and also entrainment air intake means to provide entrainment air to mix with the engine exhaust. Desirably, the bypass ratio is at least 1 over 6 and preferably 1 over 2. Also, desirably the bypass ratio is no greater than 5 over 4.

In the preferred form, the entrainment air intake means is constructed and arranged to have an entrainment air to engine exhaust mass flow ratio of at least 1 over 5 for higher bypass ratio engines. Preferably this ratio is at least as great as 4 over 5 for lower bypass ratio engines. Also, in the preferred form this ratio is no greater than about 1 over 1.

In the method of the present invention, a supersonic airplane is provided as described above. During take-off and climb, the supersonic engine means is operated at the relatively lesser power setting so as to be operating within a noise level no greater than the predetermined noise level. At the same time, the subsonic engine means is in its deployed position and developing the boost thrust during take-off and climb to make up the difference between the take-off and climb thrust required and the lower thrust developed by the supersonic engine means when operating at the relatively lesser power setting.

When the airplane is operating in the supersonic range, then the subsonic engine means is in the nonoperating mode and the supersonic engine means develops adequate thrust for supersonic flight.

Other features of the present invention will become apparent from the following detailed description.

DESCRIPTION OF THE DRAWINGS

FIG. 1 is a top plan view of a first embodiment of the present invention, showing a supersonic airplane with supersonic cruise engines and one auxiliary subsonic engine in a deployed position. The airplane configuration features a forward canard surface and a curciform aft tail (tri-surface airplane);

FIG. 2 is a side elevation view of the airplane of the first embodiment of FIG. 1;

FIGS. 3, 4 and 5 are top plan view, side elevational view, and a sectional view, respectively, illustrating the installation of the auxiliary subsonic engine in more detail;

FIG. 6 is a schematic top plan view of the first embodiment of the present invention, showing a single auxiliary subsonic boost engine and an airplane configuration with a forward canard surface;

FIG. 7 is a side elevational view of the airplane of FIG. 6;

FIG. 8 is a top plan view of a second embodiment of the present invention showing only the aft portion of the fuselage, where there are two stowable auxiliary subsonic engines, this embodiment being similar to the canard airplane shown in FIGS. 6 and 7;

FIG. 9 is a side elevation view of the airplane of the second embodiment of FIG. 8;

FIG. 10 and 11 are sectional views taken along lines 10—10 and 11—11, respectively of FIG. 9, illustrating the forward and rear auxiliary subsonic engines in broken lines moving between deployed and stowed positions;

FIG. 12 is a top plan view of the third embodiment of the present invention showing only the aft portion of the fuselage, where there is a single subsonic engine buried in the aft fuselage, this embodiment being similar to the canard airplane shown in FIGS. 6 and 7;

FIG. 13 is a side elevation view of the third embodiment of the present invention shown in FIG. 12;

FIG. 14 is the top plan view of a fourth embodiment of the present invention showing a supersonic airplane with only two supersonic cruise engines and two stowable auxiliary subsonic engines in a deployed position. The airplane is a single surface airplane;

FIG. 15 is a front elevation view of the airplane of FIG. 14;

FIG. 16 is a side elevation view of the airplane of FIGS. 14 and 15;

FIG. 17 is a sectional side view of a typical supersonic engine installation utilized in the present invention and having a two-dimensional ejector;

FIG. 18 is a sectional side view of a typical supersonic engine installation utilized in the present invention and having an axi-symmetric ejector;

FIG. 19 is a plot of engine thrust versus flight Mach number for straight jets and low bypass ratio supersonic engines;

FIG. 20 is a plot of jet mixing noise versus jet velocity;

FIG. 21 is a plot of jet velocity versus percentage take-off thrust for straight jets and low bypass ratio supersonic engines;

FIG. 22 is a plot of airplane take-off gross weight versus noise for a range of bypass ratios and two ejector concepts. It also shows the effect of adding an auxiliary subsonic boost engine;

FIG. 23 is a plot of engine specific fuel consumption versus engine power at subsonic cruise with four supersonic engines;

Figure 24:
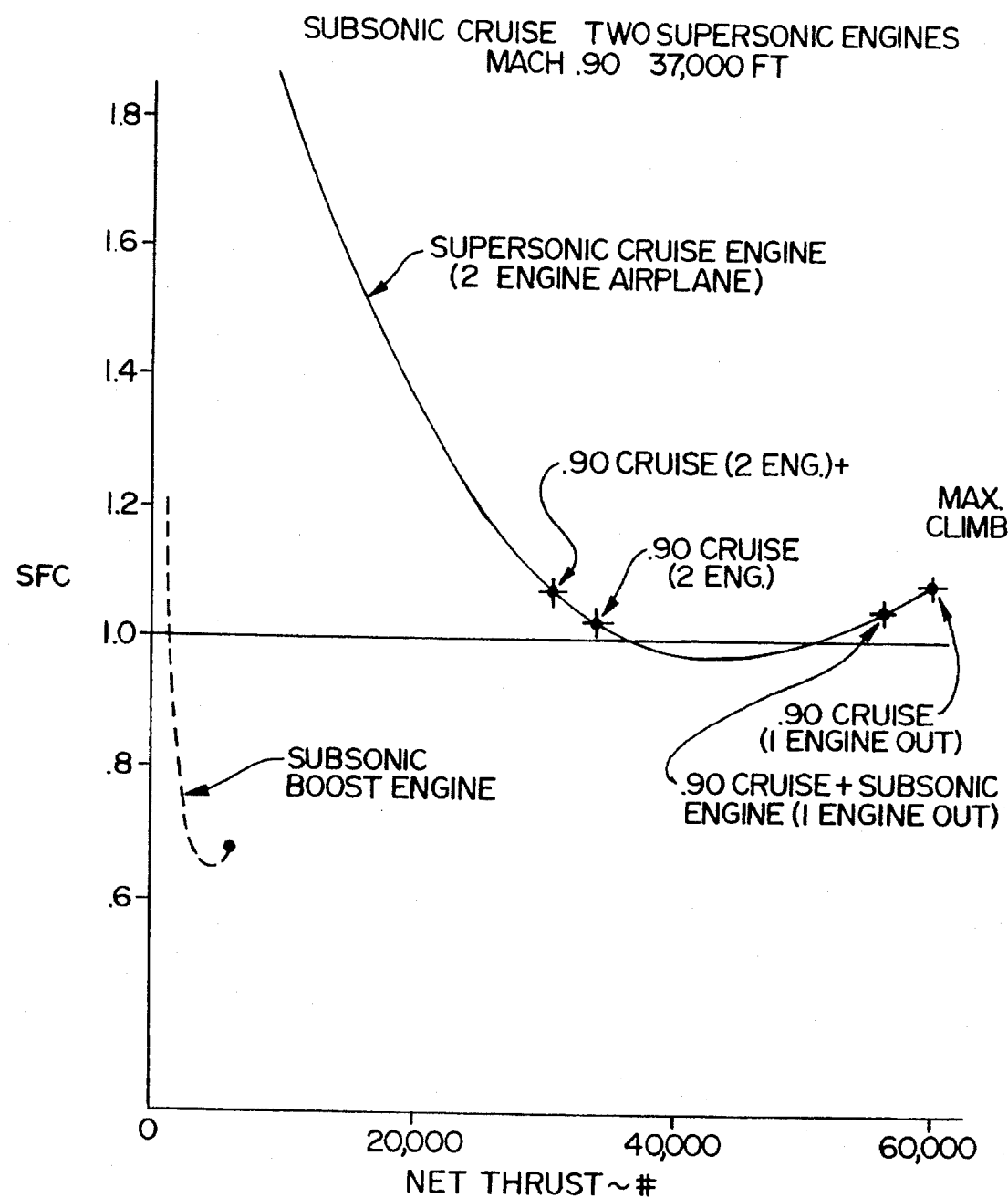
FIG. 24 is a plot of engine specific fuel consumption versus engine power at subsonic cruise with two supersonic engines.

DESCRIPTION OF THE PREFERRED EMBODIMENTS (a) First Embodiment: "Four Plus One Airplane"

In FIGS. 1 through 5, there is shown a first embodiment of the airplane of the present invention. This airplane 10 comprises a fuselage 12, a delta wing 14, and a vertical stabilizer 16. This airplane 10 is designed to travel at supersonic speeds, and the basic fuselage and wing configuration of this airplane is or may be of more or less conventional design. More particularly, the delta wing 14 is highly swept and it is provided with appropriate leading and trailing edge flaps indicated at 18 and 20, respectively. Also, there are forward and main landing gear components indicated at 22 and 24, respectively. As is common in the prior art, the forward end portion 26 of the fuselage 12 has the cockpit area, and the main central portion 28 of the fuselage provides the payload containing area where passengers are carried. As shown herein, this first embodiment has a Canard 17. The vertical stabilizer 16 is provided with the appropriate control surfaces 21 and provides structural support for the aft horizontal tail 19.

As indicated earlier, of particular significance in the present invention is the propulsion system, and more particularly a proper combination of supersonic and subsonic engines. In the particular embodiment shown herein, there are provided four supersonic engines 30 which are particularly designed to function in the combination of the present invention. Each engine 30 has in the preferred embodiment a supersonic inlet 31 which is capable of taking in air at supersonic speeds and reducing this air to subsonic velocity, with this air being directed through a compressor section, a combustion section and a turbine section to be discharged out a variable area exhaust nozzle 32.

The inlet 31 is capable of proper operation from take-off speeds to cruise Mach numbers in the supersonic range, and in the preferred embodiments described herein, Mach numbers higher than 2.0. As shown herein, these four engines 30 are positioned on opposite sides of the fuselage 12, and are positioned below the rear portion of the delta wing 14, the pair of engines on either side being spaced apart spanwise, with the rear end of the exhaust nozzle 32 being positioned behind the trailing edge 34 of the wing 14.

In addition, there is also an auxiliary subsonic engine installation 38, positioned in an aft portion 40 of the fuselage 12. In this first embodiment, as illustrated in FIGS. 3, 4 and 5, the engine installation 38 is a stowable engine and is mounted by a strut 42 at a hinge location 44 at an upper side portion of the fuselage rear portion 40.

As can be seen in FIG. 5, the subsonic auxiliary engine installation 38 has a stowed position where it is located totally within the rear fuselage portion 40, and a hinge mounted door 46 is provided to enclose the engine installation 38 and form a substantially uninterrupted outer aerodynamic surface 48 of the aft fuselage 40. The door 46 is hinge mounted at a lower location 50 so that the door 46 can be swung downward to a laterally extending position. Suitable actuators are provided to rotate the engine installations 38, and since such actuators may be of conventional design, these are not shown herein.

As illustrated in FIG. 4, the engine installation 38 consists of a high bypass ratio subsonic turbofan engine 52, enclosed in an external nacelle 54 that forms the aerodynamic surface of the engine installation and also the internal passageway 56 for the bypass flow. Attached to the forward end of the engine 52 and aerodynamically faired into the nacelle 54 is an engine inlet 58 that is of conventional, fixed geometry subsonic/transonic design. Attached to the aft end of the engine 52 and aerodynamically faired into the nacelle 54 is an engine exhaust nozzle 60. This exhaust nozzle 60 is shown as a long duct mixed flow nozzle, possibly with an internal mixer to enhance mixing of fan and primary flows. However, the exhaust systems could also be one with separate fan and primary nozzles. Attached to the exhaust nozzle may be a thrust reverser 62, which is (or may be) of itself conventional.

The engine 52 and nacelle 54 are attached to the mount strut 42, which is used to deploy or stow the subsonic engine installation 38. The engine installation 38 is desirably designed so as to have as short an axial length as possible, so that it can be fitted into the aft fuselage. This also calls for a short exhaust nozzle 60. However, the inlet 58 and nozzle 60 have to be long enough to permit installation of adequate acoustical treatment against fan and turbine machinery noise. Candidate engines for the subsonic boost mode need not only be short to make a compact engine installation, but they must also be quiet, since they are operating at full power during take-off and climb-out and will be at a fairly high power setting during approach. The subsonic boost engine could be an existing two or three spool high bypass ratio engine with bypass ratios from 4.5 to 6 such as an engine from the CFM 56 engine family or the family of somewhat smaller, but more modern BR 700 series engines.

As will be disclosed more fully later herein, the supersonic cruise engines 30 are optimized for cruise, and the thrust deficit from throttling back the cruise engines for noise compliance is made up by one or more subsonic, high by-pass ratio boost engine or engines. In this first embodiment, one such subsonic engine 38 is used, with two subsonic engines being used in the second embodiment.

In this first embodiment, there are two preferred airplane configurations or versions. The first one shown in FIGS. 1, 2, 3, 4 and 5 is a tri-surface airplane with a forward horizontal surface or Canard 17, a delta wing 14 in an aft horizontal surface 19 mounted at about half height to the vertical tail 16. The second airplane configuration is shown in FIGS. 6 and 7 and is a pure canard airplane having a somewhat larger forward horizontal surface or canard 17, a delta wing 14 and no aft horizontal surface with a simple vertical tail 16. This same single canard airplane configuration is utilized also for the second and third embodiment of this invention shown in FIGS. 8 through 13. For convenience, the same numerical designations are given for both versions.

(b) Second Embodiment: Four Plus Two Airplanes

In FIG. 8, 9, 10 and 11, there is shown a second embodiment of the airplane of the present invention. This airplane is identical in its forward portion to the second version of the airplane of the first embodiment (FIGS. 6 and 7). The differences are in the aft fuselage, aft of the cabin pressure bulkhead. Instead of one auxiliary subsonic engine, the airplane of the second embodiment has two auxiliary subsonic engines 136 and 138 positioned on the aft position 140 of the fuselage 112.

In this second embodiment, as illustrated in FIGS. 8, 9, 10 and 11, each engine installation 136–138 is a stowable engine and each is mounted by a strut 142 at a hinge location 144 at an upper side portion of the fuselage rear portion 140. Since the engine installations 136 and 138 are substantially identical to one another, except for the fact that one is deployed at an operating location to the right of the fuselage and the other to an operating location to the left of the fuselage, the various components of each and also the components associated directly therewith will be described only for one of the engine installations 136 and 138.

As can be seen in FIGS. 10 and 11, each subsonic auxiliary engine installation 136 and 138 has a stowed position where it is located totally within the rear fuselage portion 140, and a hinge mounted door 146 is provided to enclose the engine installations 136 and 138 for a substantially uninterrupted outer aerodynamic surface 148 of the aft fuselage 140. The door 146 is hinge mounted at a lower location 150 so that the door 146 can be swung downward to a laterally extending position. Suitable actuators are provided to rotate the engine installations 136 and 138, and since such actuators may be of conventional design, these are not shown herein.

Each of these engines 136 and 138 is, in overall design, substantially the same as, or at similar to, the engine installation 38 as shown in FIG. 4. Accordingly, components of the engine installations 136 and 138 which are the same, or similar to, components of the engine installation 38 are given like numerical designations with the drawing, but having the numeral "1" as a prefix. Thus, the subsonic turbo-fan engine is designated 152, the external nacelle is designated 154, etc. The descriptive portion relating to the engine installation 38 applies as well to the engine installations 136 and 138, so this description will not be repeated with regard to engine installations 136 and 138.

(c) Third Embodiment: Four Plus One (Buried) Engine Airplane

In FIGS. 12 and 13, there is shown a third embodiment of the airplane of the present invention. This airplane 210 is identical in its forward portion to the second version of the airplane of the first embodiment (FIGS. 6 and 7). The differences are in the aft fuselage 240 aft of the cabin pressure bulkhead.

In addition to the four supersonic cruise engines 230 on the wing (not shown), this airplane 210 has a single large subsonic boost engine 236 installed in the aft portion 240 of the fuselage 212. The subsonic boost engine 236 is mounted inside the non-pressurized aft fuselage 240 on an internal overhead mount strut 242 which is integral with the box structure of the vertical tail 216 and with an access door 246 below the engine for installing and servicing of the engine.

The air supply to the engine 236 comes through two inlet scoops 244, one on either side of the fuselage. The inlet scoops 244 are hinged at their downstream end to the aft fuselage 240 and are actuated from the inboard side by actuator means 249. The inlet scoops 244 have a rounded outward lip 247 and a sharp divider on the inboard side that serves as a boundary layer trap 248. This is an S shaped inlet scoop. The inlet scoops 244 are only open when the boost engine 236 is operating, i.e., at subsonic flight speeds. In supersonic flight the inlet scoops 244 are closed and form a smooth surface with the aft fuselage 240. Attached to the engine 236 are the inner fan duct wall 250, an exhaust mixer 252 and an exhaust plug 254. The fan outer duct wall 256 is part of the fuselage inner wall and the access door. The engine exhaust system 258 has two exhaust pants 260 which can be S shaped exhaust ducts; one on either side of the aft fuselage 240. The exhaust pants 260 are hinged on their forward and outboard ends to the fuselage structure and are actuated from the inboard side by actuator means 262. The nozzle pants 260 are only opened when the boost engine is operating, i.e. at subsonic speeds. In supersonic flight the nozzle pants 260 are closed and form a smooth surface with the aft fuselage 240. There is no thrust reverser shown in this installation. It could be located between the engine aft end, i.e. the mixer 252 and plug 254 and the nozzle pants 264, or it could be a fan cascade reverser located in the forward fan outer duct 256.

Shorter inlet and exhaust systems for the buried subsonic boost engine may be feasible, but may compromise engine performance somewhat. A candidate for a shorter inlet might be a louvered inlet with a multitude of vertical or longitudinal slots in the side of the vertical side walls of the fuselage, just forward of the engine. These louvers would be closed in cruise and opened for low speed operation of the boost engine. A candidate for a shorter exhaust system might be a fold-out shorter pair of pant-shaped ducts with internal turning vanes.

(d) Fourth Embodiment: Two Plus Two Airplane

In FIGS. 14, 15 and 16 there is shown a fourth embodiment of the airplane of the present invention. This airplane 310 may be of the same size as the airplanes of the first, second and third embodiment. The main difference; however, is that it has only two supersonic cruise engines. This makes the cruise engines rather large and it may be concluded that this twin engine concept lends itself better to a smaller size supersonic transport to keep the size of the engines within practical limits.

This airplane 310 comprises a fuselage 312, a delta wing 314, and a vertical stabilizer 316. This airplane 310 is designed to travel at supersonic speeds, and the basic fuselage and wing configuration of this airplane is or may be of more or less conventional design. More particularly, the delta wing 314 is highly swept and it is provided with appropriate leading and trailing edge flaps indicated at 318 and 320, respectively. The trailing edge flaps 320 are all active control surfaces, generally referred to as elevons. The wing only airplane of this fourth embodiment has no canard or aft horizontal tail for pitch control. Therefore all the pitch control has to come from wing trailing edge devices. Also, there are forward and main landing gear components indicated at 322 and 324, respectively. As is common in the prior art, the forward end portion 326 of the fuselage 312 has the cockpit area, and the main central portion 328 of the fuselage provides the payload containing area where passengers are carried. As shown herein, this first embodiment 310 does not have a canard, but a canard could be added (as it is in the first and second embodiment). The vertical stabilizer 316 can of itself also be of conventional design, and is provided with the appropriate control surfaces.

As indicated earlier, of particular significance in the present invention is the propulsion system, and more particularly a proper combination of supersonic and subsonic engines. In the particular embodiment shown herein, there are provided two supersonic engines 330. Each engine 330 has in the preferred embodiment a supersonic inlet 331 which is capable of taking in air at supersonic speeds and reducing this air to subsonic velocity with this air being directed through a compressor section, a combustion section and a turbine section to be discharged out a variable area exhaust nozzle 332.

As shown herein, these four engines 330 are positioned on opposite sides of the fuselage 312, and are positioned below the rear portion of the delta wing 314, the pair of engines on either side being spaced apart spanwise, with the rear end of the exhaust nozzle 332 being positioned behind the trailing edge 334 of the wing 314.

In addition, there is also a forward and a rear auxiliary subsonic engine installation 336 and 338, positioned in an aft portion 340 of the fuselage 312. The installation of the auxiliary subsonic engines is similar to the installation of the second embodiment in FIGS. 8, 9, 10 and 11. The engines 336 and 338 are located along the sides of the aft fuselage 340 in this low speed operating mode and are relocated into the aft fuselage 340 for high speed and supersonic flight. The auxiliary subsonic engines 336 and 338 shown in the fourth embodiment are representative of what a new generation geared fan high bypass ratio engines would look like.

(e) Combination of Features of The Four Embodiments

The preferred embodiments of this present invention have two or four cruise engines, with four cruise engines presently believed to be more preferred. However, the principle of this invention could be applied to airplane having, for example, three cruise engines. Similarly, the number of subsonic boost engines in the preferred embodiments are one or two, but could be three or four, as long as they can be made to stow away in the fuselage.

The number of subsonic boost engines influences the total amount of boost thrust available and therefore the magnitude by which the supersonic cruise engines can be throttled back and hence the possible noise reduction. The single boost engine folding into the aft fuselage, of the first embodiment, used on a standard single aisle fuselage, limits the boost engine thrust to about 25,000 # S.L.S. This being strictly due to space constraints and structural considerations. With the two boost engines of the second embodiment the engine size has to be slightly reduced for the aft engine installation, so the total boost thrust available is in the order of 2×18,000= 36,000 # S.L.S. With a single engine of the third embodiment, buried in the aft fuselage, the engine size is limited to somewhere between 30,000 to 35,000 # S.L.S. thrust. This assumes no lengthening of the aft fuselage. If the aft fuselage is lengthened or locally increased in diameter, boost engines of larger size and more thrust become feasible. The drag and weight penalties associated with this fuselage change may still provide an economical airplane configuration, if the supersonic cruise engines can be chosen nearer the optimum for supersonic flight, and fewer compromises are made for low speed noise reduction. It is obvious that a single boost engine is preferable to two, due to complexity and cost considerations. The fold-out engine installation has good inlet recovery, good nozzle performance and good maintainability. But it requires that the engine services be routed through the swiveling strut. Also, it's inlet may be too close to the jet of the inboard supersonic engine.

The buried boost engine has a simpler, fixed installation and should have no problems with ingestion of the jet from the supersonic engines. But it has other disadvantages, such as more complex inlets and exhausts, poor inlet recovery and nozzle performance and is more difficult to maintain. Another criterion that may swing the choice of boost engine installation is, up to what speeds the boost engine is to be used. If the boost engine is only used at low speed, say up to Mach 0.6, the buried installation provides good enough inlet recovery. However, if the boost engine is also used during subsonic cruise at Mach 0.9, like in an engine-out situation, the better performance of the free stream inlet would favor the fold-out boost engine installation concept.

The aft end of the fuselage is probably the best place to install the auxiliary subsonic engines. This dictates that the airplane cannot have a large aft horizontal tail, since it would not leave enough room for the installation of the boost engines. Therefore, the pitch control concept is limited to the following three configurations:

(a) tailless airplane (see FIGS. 14 and 16) with all pitch control in the wing trailing edge (b) canard airplane with forward horizontal tail (See FIGS. 6 and 7)

(c) tri-surface airplane with a forward canard, main wing and a small aft horizontal tail mounted off the vertical tail (see FIGS. 1 and 2).

It is to be understood that other combinations than the ones shown can be made as far as choice of the number of cruise engines or boost engines and the pitch control concept are concerned.

(f) Descriptions of the Installation of the Supersonic Cruise Engines

The basic configuration of the supersonic engines used in the present invention is or may be conventional. However, these engines must be designed to have during at least takeoff and climb the proper amount of secondary air mixed with the primary exhaust to arrive at the combination of the present invention.

FIG. 17 shows schematically the sectional side view of a typical supersonic cruise engine installation in conjunction with a two-dimensional ejector nozzle. The most likely engine used in this installation is a low bypass ratio mixed flow turbofan engine (maybe BPR 0.35). The engine 30 is installed in a nacelle 70. The engine inlet shown is axi-symmetric and consists of an outer inlet barrel 31 and an inlet spike 72, which moves fore and aft for area control (mixed compression inlet). The exhaust system transitions from the circular engine aft section into a rectangular ejector nozzle 32. The ejector consists of a multitude of inlet doors 74 on the upper and lower side of the nacelle, a multitude of vertical splitter walls 75 and a splitter wall 79 that divides the ejector and nozzle into an upper and lower half.

The exhaust nozzle consists of upper and lower nozzle doors 76 that are hinged at (and actuated at) their forward ends, two fixed side walls 78 and a two-dimensional plug 77 that can be actuated to expand and contract. In the supersonic cruise mode and any other high speed mode without noise suppression the ejector inlet doors 74 are closed (as shown) and the nozzle flaps 76 in conjunction with the two dimensional plug 77 are actuated to provide the most optimum nozzle throat and final discharge areas. In the noise suppression mode the ejector inlet doors 74 are opened and ambient air is sucked into the exhaust through channels formed between vertical splitters 75. Channels with ambient air are interspersed with channels carrying engine exhaust gas. Ambient air and engine exhaust mix downstream. Acoustic treatment on the nozzle walls attenuates some of the mixing noise. The nozzle doors 76 and the plug 77 open up the nozzle area to allow the passage of the extra air taken in through the ejector. The ejector and the plug double up as thrust reversers. A two dimension ejector as shown in FIG. 17 can handle aspiration ratios, that is the amount of ambient air over engine exhaust flow, of up to about 120%. The device drawn in FIG. 17 was designed for an aspiration ratio of 85%.

FIG. 18 shows schematically the sectional side view of a supersonic cruise engine installation in conjunction with an axi-symmetric ejector nozzle. The most likely engine used in this installation is an intermediate bypass ratio mixed flow turbofan engine (maybe BPR 0.070). The engine 30 is installed in an axi-symmetric nacelle 80. The engine inlet shown is axi-symmetric and consists of an outer inlet barrel 31 and an inlet spike 82, which moves fore and aft for area control (mixed compression inlet). The exhaust system is also axi-symmetric and consists of a thrust reverser 83, a fixed nozzle barrel 88, a multitude of ejector inlet doors around the circumference, a multitude of nozzle flaps 86 that are hinged at their forward end and are actuated therefrom. In the center of the exhaust system is a plug 87 that can be actuated fore and aft on a tube 89 that extends aft from the engine exhaust.

In the supersonic cruise mode and any other high speed mode without noise suppression, the ejector inlet doors 84 are closed and the nozzle flaps 86 in conjunction with the translating plug 87 are actuated to provide the optimum nozzle throat and final discharge areas. In the acoustic mode the ejector inlet doors 84 are opened, ambient air is sucked into the exhaust in an annulus and mixes with the engine exhaust gases. Acoustic treatment is provided on the nozzle walls and plug to attenuate mixing noise. The nozzle doors 86 open up to allow the passage of the extra air taken in through the ejector. The plug is used for throat area control in the ejector. For reverse thrust the cascades 83 are uncovered by moving inner and outer sleeves aft and the aft duct is blocked by moving the plug against the inner thrust reverser sleeve. An axi-sytmmetric ejector as shown in FIG. 18 can handle aspiration ratios of 20 to 30% at the most.

Another alternative for the supersonic jet engine of FIG. 18 is to utilize the plug nozzle 87 and further incorporate turning vanes and/or vortex generators to alleviate noise. The ejector doors 84 could be eliminated, and the bypass ratio of the engine could be made higher to provide adequate secondary air. In this instance, the bypass ratio would be at least 1 over 1, and likely no greater than 4 over 3.

The logic to put a two dimensional ejector of higher aspiration ratio on a lower bypass ratio engine (BPR 0.35) is that it has high jet velocities and hence needs a higher aspiration ratio to lower the jet noise to the target level. A two dimensional ejector of 85% aspiration ratio can provide noise reductions of 12 to 15 dB at a thrust loss in the acoustic mode of 6–8%. Going to higher aspiration ratios of say 120% has proven to be fairly inefficient. The noise reduction of 20 to 22 dB once sought for the straight jet engine cannot quite be achieved. Yet the thrust loss of a two-dimensional ejector with 120% aspiration ratio can reach 12%, thus requiring oversized engines. The higher bypass ratio engine (BPR 0.70) has somewhat lower jet velocities and hence only needs a lower aspiration ratio ejector to lower the jet noise to the target level. The axi-symmetric ejector of 25% aspiration ratio can provide jet noise reductions of 6 to 8 dB at a thrust loss in the acoustic mode of only about 2%.

There is another aspect yet to consider when selecting the right engine bypass ratio and ejector combination. The thrust losses quoted above refer to a climb-out speed of about Mach 0.30. It is very likely that the engines have to remain in the acoustic mode for altitudes below, say 20,000 feet and speeds of up to, say Mach 0.06, to minimize the EPA mandated far field noise. It has to be recognized that the thrust losses caused by an ejector rise more steeply with speed at higher aspiration ratios. This suggests that it is not advisable to try to cure the jet noise problem by increasing aspiration ratio, since the thrust losses don't allow a deep engine power cutback and thus produce more noise at the higher power settings. This consideration is a strong argument in favor of the subsonic boost engine concept of the present invention.

(g) Engine Sizing and Cycle Characteristics

It is believed that a clearer understanding of the present invention can be obtained by first reviewing certain characteristics of supersonic jet engines and how these relate to design characteristics of the engine (more specifically by-pass ratio and percentage of entrainment air by means of an ejector), and also the operating modes of the aircraft (more specifically take-off and initial climb, and also cruise mode). These will be discussed relative to FIGS. 19, 20 and 21.

The various values and relationships which are illustrated in FIGS. 19 through 24 of this application are derived in part from data and information available from various sources, and also in part from information and data developed by the applicant herein. However, it is to be understood that the subject matter presented in these FIG. 19 through 24 and the presentation of the same in this text were developed by the applicant as part of his analysis in developing the underlying concepts of the present invention.

In designing engines for a supersonic transport with a cruise speed capability of Mach 2.0 or higher the usual starting point is to size the engines in accordance with the thrust requirement at the end of climb (i.e. at cruise Mach, initial cruise altitudes and a minimal rate of climb, maybe 500 ft per minute. Engine lapse rates (i.e. the decline of thrust with forward speed and altitude) is dependent on the specific thrust or bypass ratio of the engine. The higher the bypass ratio the steeper is the lapse rate.

We start with FIG. 19, which is a plot of engine thrust versus Mach number for three candidate engines, namely a straight jet (BRR zero) and engines of BPR 0.5 and 1.0.

Assuming airplanes of equal weight and size, the three types of engines are designed to have the same thrust at end of climb (e.g. Mach 2.4, 57,000 ft. altitude). This is shown in the lower right hand corner of FIG. 19. Following these same three engines to sea level and low Mach numbers, as can be seen in the upper left hand corner, FIG. 19 shows that the higher bypass ratio engines have higher low speed thrust. At climb out speed of Mach 0.30 the BPR 0.5 engine has about 15% more maximum thrust available than the straight jet engine, and the BPR 1.0 engine 30% more. We first turn our attention to the straight jet engine with regard to the thrust developed at cruise and also the thrust developed at take-off. FIG. 19 shows a take-off thrust requirement, which the straight jet engine sized at end of climb meets right on. The thrust requirement, however, is a net thrust requirement. As will be explained later with reference to FIG. 21, by the time a 120% aspiration ratio ejector is added to the straight jet (in hope of meeting noise limitation requirements), with a thrust loss of say 12% at climb-out speed as a result of such 120% aspiration ratio, the straight jet has to be oversized by 12% for take-off and is no longer sized for optimum performance at end of climb. The bypass engines at BPR 0.5 and 1.0 are sufficiently oversized to accept their respective ejector losses of 7% and 2% and do not need to be resized for take-off. It should be noted here that absolute numbers for engine thrust are shown in FIG. 21 for a better understanding of the concept. They are based on an airplane take-off gross weight of about 720,000 # and a certain technology level in Aerodynamics, Structures, Propulsion and Systems.

FIG. 20 shows a generic plot of jet noise levels from four jet engines at 650 lbs/sec. mass flow each, at Mach 0.30, as a function of jet velocity. The curve resembles a parabola. The noise change is fairly flat at high jet velocities and steepens for lower jet velocities. FIG. 20 also shows two horizontal lines, one at 102.5 dB representing the Stage 3 noise limit for an airplane in the 750,000 lb. gross weight range and another horizontal line at 98.5 dB representing a possible future noise limit (Stage 4) which is the Stage 3 dB level less 4 dB.

The three candidate engines from the FIG. 19 are indicated on the noise curve. The straight jet has a jet velocity of a little over 3000 ft/sec with jet noise around 122 dB or about 20 dB over the Stage 3 limit. The BPR 0.5 engines have a jet velocity of about 2500 ft/sec and a 120 dB noise level, while the BPR 1.0 engines are at near 2000 ft/sec velocity and a noise level of about 115 dB.

As indicated at the top of FIG. 20, these decibels values are calculated on the basis of sideline noise when the airplane is traveling at MACH 0.3 at take-off, with each engine sized at 650 lbs per sec of airflow. Since the thrust developed has a direct ratio to velocity, it is to be understood that the thrust developed by the straight jet with that airflow would be greater than that developed by the engine with the 0.5 by-pass ratio with that same rate of airflow, and greater yet than the engine with the by-pass ratio of 1.0. Thus, a true comparison of the noise generated when we consider the three candidate jet engines of equal thrust is flatter than that which is shown in FIG. 19. Thus, the noise reduction due to bypass ratio seems to be small and almost not worthwhile. But this is deceiving. Another consideration relative to FIG. 20 is that jet noise, which is plotted here, is only one out of six noise sources contributing to overall noise: jet noise, fan forward noise, fan aft noise, turbine noise, core noise and airframe noise. Experience teaches that on a supersonic airplane jet noise has to be at least 1 dB lower than the overall noise goal for sideline and up to 3 dB lower for take-off with cut-back noise. The 1 and 3 dB respectively are the contributions from the other five noise sources.

To continue our analysis, we now look at FIG. 21 which is a qualitative plot of the expected jet velocity reductions in the three candidate engines (i.e. straight jet, BPR 0.5 and BPR 1.0), as a result of changes in bypass ratio, throttling back the engines and adding ejectors. The vertical axis is jet velocity and the horizontal axis is take-off thrust in percent of nominal.

The straight jet is shown to require 12% oversizing, as was mentioned earlier. The 120% aspiration ratio ejector reduces the jet velocity from about 3000 ft/sec to around 1700 Ft/Sec and the 12% excess thrust is lost in the ejector. To explain this further, it will be recalled (with reference to FIG. 19) that if a straight supersonic jet engine which is to operate at Mach 2.4 is properly sized and designed so that it develops adequate thrust for cruise at a certain power setting, this same engine coincidentally also provides adequate thrust at take-off. However, with reference to the graph of FIG. 20, this would mean that the straight jet would have an exhaust velocity of 3,000 ft/sec, which would clearly generate too much noise. Accordingly, to attempt to bring the jet velocity down to an adequately low level to meet the noise requirements, there is shown in FIG. 21 a value of 120% entrainment air taken in through the ejectors in the aft end of the engine. To design the engine to take in this amount of entrainment air, it is necessary to oversize the engine by about twelve percent. As will be disclosed later herein with reference to FIG. 22, this increases the weight of the engine (and consequently the weight of the aircraft) to such an extent that it would likely become prohibitive for a commercially feasible supersonic jet airplane.

The bypass ratio 0.5 engine starts at about 2500 ft/sec jet velocity and 15% excess thrust. It can be throttled back by about 8%, reducing jet velocity by an estimated 150 ft/sec. The ejector with an aspiration ratio of 85% loses the remaining 7% in excess thrust and lowers the jet velocity to an estimated 1500 ft/sec.

The bypass ratio 1.0 engine starts at about 2000 ft/sec jet velocity and 30% excess thrust. It can be throttled back by about 28%, reducing jet velocity by an estimated 450 ft/sec. The ejector with an aspiration ratio of 25% lowers the remaining 2% in excess thrust and reduces the jet velocity to an estimated 1400 ft/sec.

As indicated previously, the information contained in the graph of FIG. 21 relates the effect of engine by-pass ratio, entrainment air, and throttling back relative to the effect on jet velocity reduction, and hence its effect on noise. It now becomes necessary to relate this information to the effect it has on the design of the supersonic jet engines in an actual airplane. This brings us to the next section which is immediately below.

(h) Airplane Sizing and the Impact of Subsonic Boost Engines

FIG. 22 is a plot of airplane take-off gross weight versus overall noise level (take-off and sideline) with the datum point O representing Stage 3 noise levels. The calculations were made for an airplane with a payload of 300 passengers plus baggage, a range of 5000 NMi and a cruise number of Mach 2.4. Take-off gross weight shown on the vertical axis of FIG. 22 is a measure for economical viability of an airplane (one of several possible goodness factors), with the lowest gross weight airplane assumed to be the most economical. An absolute scale is shown in FIG. 22 for a better understanding of what impact the incorporation of a subsonic boost engine has on airplane weight and noise. The absolute level of weights could shift drastically if technology levels in Aerodynamics, Structures, Propulsion and Systems were to be changed.

There are two basic curves connecting the solid symbols. The first one using squares is for low bypass ratio engines using a high aspiration ratio ejector with 85% entrainment. The only solid points are for BPR 0.35 and 0.62. The shape of the curve is based on preliminary estimates, as is the point for an oversized turbojet on the left end of the curve.

The second curve is using circular symbols and is for intermediate bypass ratio engines using a low aspiration ratio ejector with 20% entrainment. The only solid points are those for BPR 0.62 and 1.05 and the shape of the curve is estimated.

Let us examine first the curve which connects the black squares. The engines of this curve are all assumed to have 85% entrainment air, with the by-pass ratio varying from 0.62 (at the extreme right) and a by-pass ratio of zero, which is at the extreme left of that curve and is entitled "Oversized Turbo-jet", and has an entrainment ratio of 120%. It can be seen that with a by-pass ratio of 0.62, the noise generated at take-off is actually somewhat below the minus 4.0 decibel reduction required to meet the new expected noise standards. However, the gross weight of the airplane at take-off would be over 900,000 lbs.

When the by-pass ratio of the engines drops to 0.4 with eighty five percent entrainment, the gross weight of the airplane drops substantially to about 750 lbs, but it is only slightly more than 1.0 dB below present Stage 3 (indicated at zero in FIG. 22). As the by-pass ratio is decreased further to 0.35, the gross weight actually goes up and the noise level increases. When we get to the straight jet engine (entitled "Oversized Turbo-jet" in FIG. 22), the noise level is about 2 dB above Stage 3 and the weight is increased to nearly 800,000 lbs.

We now turn our attention to the curve that connects the black circles, this representing the gross take-off weight and the noise level of the airplane having a twenty percent entrainment level, and with different by-pass ratios. It can be seen that with a 1.05 by-pass ratio (with a twenty percent entrainment), the noise level is a little bit more than 3 dB less than the present Stage 3 level, but the gross weight is a little over 800,000 lbs. When the by-pass ratio is reduced to 0.75, the noise level is only 1 dB below present Stage 3, but the gross weight has dropped to about 720,000 lbs. Then when the bypass ratio is decreased further to 0.62, the gross weight is slightly over 700,000 lbs, but the noise level is slightly greater than the present Stage 3 standards. Both curves suggest that Stage 3 or even Stage 3 minus 1 dB noise limits could be achieved with either of the two concepts at a reasonable take-off gross weight. The higher bypass ratio engines with low entrainment ejectors seem to have a slight advantage over the lower bypass ratio engines with high entrainment ejector. However, at noise levels beyond Stage 3 minus 2 both curves angle up steeply. At a noise level of Stage 3 minus 4 the gross weight reaches 850,000 lb, which is probably too high for an economically viable airplane.

It should also be noted that these noise numbers are calculated using optimistic projections for ejector performance, use only 50% instead of 85% confidence levels and assume that the airplane overspeeds on take-off to reduce take-off/cut-back noise and uses programmed lapse rate (PLR) during take-off rotation to reduce sideline noise. Using less favorable assumptions for the noise calculations and providing an 85% confidence level for noise compliance, could shift the noise scale of the FIG. 22 plot to the right by 2 to 3 dB. So there seems to be a real need for further noise reduction without the steep rise in take-off gross weight. The subsonic boost engine concept of the present invention provides just that, and this is described more fully below.

Calculations were made for an airplane similar to the airplane of the first embodiment shown in FIGS. 1 through 5 that uses a single BR 715 subsonic boost engine in a retractable nacelle. Sea level static thrust of the BR 715 engine was assumed to be 22,000 lbs. The installed engine weight, including changes to the aft fuselage is about 7800 lbs, which cycled into the airplane with a factor of 4.2, results in a takeoff gross weight increment of about 31,500 lbs.

The incremental drag of the stowed boost engine at supersonic cruise was assumed to be zero. Applying this boost engine to an airplane with bypass ratio 0.62 engines with 20% entrainment ejectors does not eliminate the shock cell noise in the supersonic cruise engines and provides a noise reduction of about 3.0 dB. The resulting airplane weight is about 735,000 lbs on take-off and meets nominally Stage 3-2.8 dB. This is illustrated in the graph of FIG. 22, where a lighter straight line is drawn from the black circle at the 0.62 by-pass ratio location for the 20% entrainment jet engine, this line leading to a circle having a white interior.

Applying the same engine to an airplane with bypass ratio 0.75 engines with 20% entrainment ejectors eliminates the shock cell noise in the supersonic cruise engines and provides a noise reduction of about 3.5 dB. The resulting airplane weight is about 753,000 lb on take-off and meets nominally Stage 3-4.4 dB. This is shown in FIG. 22 by projecting a line from the solid black dot at the 0.75 BPR location on the curve showing twenty percent entrainment, to a location of a circled dot (white interior) indicating 0.75 by-pass ratio, and a second circle (white interior with a plus sign therein) which shows a further noise reduction because of the alleviation of shockcell noise.

Applying the same boost engine to an airplane with bypass ratio 0.40 engines and 85% entrainment ejectors is a poorer starting position with higher gross weight (by about 30,000 lb), but provides the same minus 3.5 dB noise reduction for a 31,500 lb take-off gross weight penalty.

So in summary, the use of auxiliary subsonic boost engines is a more economical way to reduce engine noise beyond a certain point, than is an increase in engine bypass ratio or ejector entrainment ratio.

(i) Rationale for Auxiliary Subsonic Boost Engines

There remains one question, why the subsonic boost engines provide noise reduction with a lower penalty than does an increase in bypass ratio or ejector entrainment ratio. One has to realize that utilizing boost engines without first putting on ejectors would put us on the flat part of the noise versus jet velocity curve (FIG. 20) and the benefits of subsonic boost engines would be very small. It is because we give the boost engines credit for the last part of the jet velocity reduction, where the curve is the steepest that we see such a high payoff. This consideration, however, does not reduce the benefit of the subsonic boost engines. The boost engine, provides such favorable results because both bypass ratio and aspiration ratio are hitting the limits of their usefulness. When bypass is added to a straight jet engine, weight and nacelle size start to increase, but nacelle shape improves and engine specific fuel consumption (SFC), even at supersonic flight, improves. At higher bypass ratios the SFC improvement flattens out, the nacelle shape has no further improvement, but engine weight and nacelle drag increase. A similar trend is true for increasing aspiration ratio. The low aspiration ratio ejector with 25% entrainment can achieve a noise reduction of up to 7 dB with a 2% thrust loss or 3.5 dB per one percent thrust loss.

The higher aspiration ratio ejector with 85% entrainment can achieve a noise reduction of up to 14 dB with a 7% thrust loss or only 2.0 dB per one percent thrust loss. In addition, the low aspiration ratio ejector causes virtually no drag penalty and only a small weight penalty. The high aspiration ratio ejector, on the contrary, pays a fairly large drag and weight penalty. The subsonic boost engine, in contrast, pays only a penalty for its weight, since it is buried during cruise and pays no cruise drag penalty.

With further reference to FIG. 22, additional calculations could be made for engines having other entrainment percentages in combination with various by-pass ratios. This might provide an even better design. Further, the relative values given in FIG. 23 are for the addition of a boost engine providing 22,000 lbs of thrust for the 300 passenger airplane having a Mach 2.4 cruise speed, and having a range of 5,000 nautical miles. Further analysis may indicate that by raising the thrust provided by the boost engine(s), the points showing the airplane weight and noise levels may be moved even further to the right (indicating lower noise level) while having relatively small increases in airplane gross take-off weight.

(j) Utilization of the Auxiliary Subsonic Boost Engines

The auxiliary subsonic boost engine is beneficial not just in its function to reduce take-off side line and cut-back noise. It may show additional benefits in reducing far field noise since it can be operated beyond the speed limits of the ejectors.

Another benefit from an auxiliary boost engine may be that it can be used as a ground and inflight auxiliary power unit (APU). This would deduct about 2000 lb from the 7800 lb penalty or 8400 lb from the 31,500 lb take-off gross weight penalty.

There are yet other potential benefits to the auxiliary boost engine. During take-off and climb out the use of the auxiliary subsonic boost engine with the supersonic engines throttled back will save several hundred pounds of fuel burned.

The other question is whether the boost engines could reduce fuel burn during subsonic cruise overland or during a diversion or hold condition.

This will be discussed with reference to FIG. 23 which explains the situation of subsonic cruise at Mach 0.9 and 37,000 ft for a four engine supersonic transport. The engine thrust required for Mach 0.90 cruise is about 57% of maximum climb thrust and this power point is on the left leg of the SFC bucket. So, when the power for the supersonic cruise engine is reduced because of the utilization of a subsonic boost engine, the SFC of the cruise engines increases and negates the benefits from the lower SFC of the subsonic boost engine. The situation is different for subsonic cruise after the loss of one supersonic engine. The power point is essentially in the flat part of the SFC bucket and using a subsonic boost engine with its lower SFC could increase the range of the airplane with one engine out.

FIG. 24 is a plot similar to FIG. 23, but addresses the situations of subsonic cruise of a twin engine supersonic transport. Again, the subsonic boost engine has no merit when cruising subsonically with both supersonic engines operating. However, when one of the supersonic engines fails the airplane is slightly underthrusted for Mach 0.9 cruise at 37,000 ft, and reducing power from maximum climb on the supersonic engines reduces SFC. So, the use of a subsonic boost engine could have a very beneficial effect on increasing the one-engine-out subsonic range.

What is claimed:

1. A supersonic airplane designed to be able to fly at supersonic speed and develop adequate thrust for supersonic flight, and yet be able to develop adequate takeoff and climb thrust to enable the airplane to take off and climb and to operate during takeoff and climb at a noise level no greater than a predetermined noise level, said airplane comprising:
   a. an aircraft structure capable of operating at supersonic cruise;
   b. supersonic engine means mounted to said aircraft structure and characterized in that said supersonic engine means is capable of generating said thrust for supersonic cruise so as to maintain supersonic cruise;
   c. said supersonic engine means being characterized in that with said supersonic engine means operating to develop said takeoff and climb thrust, said supersonic engine means operates at a noise level greater than said predetermined noise level, said supersonic engine means being capable of operating at a relatively lesser power setting at a noise level no greater than said predetermined noise level, with said supersonic engine means at said lesser power setting developing a lower thrust that is below said takeoff and climb thrust;
   d. subsonic engine means having a first nonoperating mode and a second operating mode where said subsonic engine means is capable of providing a boost thrust during takeoff and climb that is at least equal to the difference between the takeoff and climb thrust and the lower thrust developed by the supersonic engine means when operating at a noise level no greater than said predetermined noise level;
   e. said supersonic engine means and said subsonic engine means being characterized in that during takeoff and climb, with said supersonic engine means operating at said lesser power setting, and with said subsonic engine means in said second operating mode, total noise level developed by said supersonic engine means and said subsonic engine means during takeoff and climb is no greater than said predetermined noise level;
   whereby said airplane is capable of operating through takeoff and climb and yet be within said predetermined noise level by operating said supersonic engine means at said lower thrust, and operating said subsonic engine means to develop said boost thrust, and said airplane is capable of supersonic operation by having said subsonic engine means in the nonoperating mode and operating the supersonic engine means to develop said adequate thrust for supersonic flight.

2. The airplane as recited in claim 1, wherein said supersonic engine means is constructed and arranged to produce engine exhaust and to operate at least during takeoff and climb with ambient air intake means to provide secondary air into said supersonic engine means to mix with said engine exhaust to provide a mixed exhaust of engine exhaust and secondary air.

3. The airplane as recited in claim 2, wherein said secondary air during takeoff and climb mode has a mass flow rate relative to mass flow rate of said engine exhaust where the ratio of the mass flow rates of the secondary air to the engine exhaust is at least as great as 4 over 5.

4. The airplane as recited in claim 3, wherein said ratio is at least as great as 1 over 1.

5. The airplane as recited in claim 3, wherein the ratio of the mass flow rate of the secondary air to the engine exhaust is no greater than 6 over 5.

6. The airplane as recited in claim 2, wherein said supersonic engine means comprises a by-pass engine means which provides bypass air to mix with said engine exhaust, and also has entrainment air intake means to provide entrainment air to mix with said engine exhaust.

7. The airplane as recited in claim 6, wherein said bypass ratio is at least 1 over 6.

8. The airplane as recited in claim 6, wherein said bypass ratio is at least 1 over 2.

9. The airplane as recited in claim 6, wherein said bypass ratio is no greater than 5 over 4.

10. The airplane as recited in claim 7, wherein said entrainment air intake means is constructed and arranged to have an entrainment air to engine exhaust mass flow ratio of at least 1 over 2.5.

11. The airplane as recited in claim 8, wherein said entrainment air to engine exhaust mass flow ratio is at least as great as 1 over 2.5.

12. The airplane as recited in claim 9, wherein said entrainment air to engine exhaust mass flow ratio is no greater than about 1 over 4.

13. The airplane as recited in claim 6, wherein:
   a. said bypass ratio is at least 1 over 6;
   b. said entrainment air intake means is constructed and arranged to have an entrainment air to engine exhaust mass flow ratio of at least 1 over 2.5.

14. The airplane as recited in claim 6, wherein:
   a. said bypass ratio is at least 1 over 2;
   b. said entrainment air intake means is constructed and arranged to have an entrainment air to engine exhaust mass flow ratio of at least 1 over 2.

15. The airplane as recited in claim 6, wherein:
   a. said bypass ratio is at least 1 over 6;
   b. said entrainment air intake means is constructed and arranged to have an entrainment air to engine exhaust mass flow no greater than about 1 over 1.

16. The airplane as recited in claim 6, wherein:
   a. said bypass ratio is no greater than about 3 over 4;
   b. said entrainment air intake means is constructed and arranged to have an entrainment air to engine exhaust ratio if at least 1 over 5.

17. The airplane as recited in claim 1, wherein said supersonic engine means and said subsonic engine means are constructed and arranged so that with said supersonic engine means operating at said lesser power setting and said subsonic engine means operating in said second mode, a ratio of the boost thrust of all subsonic engine means during takeoff and climb to the lower thrust of all supersonic engine means during takeoff and climb is at least as great as 1 over 20.

18. The airplane as recited in claim 17, wherein said ratio of the boost thrust to the lower thrust of all supersonic engine means is at least as great as 1 over 10.

19. The airplane as recited in claim 17, wherein the ratio of the boost thrust to the lower thrust of all supersonic engine means is no greater than about 1 over 3.

20. The airplane as recited in claim 1, wherein said subsonic engine means comprises at least one subsonic engine.

21. The airplane as recited in claim 17, wherein said subsonic engine means is mounted to be stowed within said aircraft structure during the nonoperating mode, and to be deployed outside of said aircraft structure during the second operating mode.

22. The airplane as recited in claim 21, wherein said subsonic engine means comprises at least two subsonic engines which in the second operating position are deployed on opposite sides of said aircraft structure.

23. The airplane as recited in claim 22, wherein said airplane comprises a wing and a fuselage, and said subsonic engines are mounted with said fuselage in the nonoperating mode and deployed outwardly on opposite sides of said fuselage during the operating mode.

24. The airplane as recited in claim 1, wherein said subsonic engine means has thrust reverser means capable of creating reverse thrust for decelerating said airplane.

25. The airplane as recited in claim 1, wherein said subsonic engine means is positioned within said aircraft structure during both said first and second modes, and during said second operating mode, inlet means for the subsonic engine means is positioned at an air intake position, and exhaust nozzle means of said subsonic engine means is arranged to discharge engine exhaust outwardly of said aircraft structure to develop thrust.

26. An airplane as recited in claim 25, wherein the engine inlet for the subsonic engine means consists of two S shaped inlet scoops and the engine exhaust for the subsonic engine means consists of two S shaped exhaust ducts, that fold out of the fuselage structure.

27. An airplane as recited in claim 25, wherein the engine inlet for the subsonic engine means consists of a series of inlet louvers in the side of the fuselage structure, that allows air to enter an inlet plenum in front of the engine, and wherein the exhaust consists of two tightly bent S ducts with internal turning vanes, said S ducts folding out of the fuselage structure.

28. The airplane as recited in claim 2, wherein the supersonic engine means comprises bypass engine means, where the bypass ratio is at least 1 over 1 and no greater than 3 over 2, where no ambient air is being entrained into the exhaust, and where the supersonic engine means has a plug nozzle.

29. The airplane as recited in claim 28, wherein there is a jet noise reducing means employed, comprising turning vanes and/or vortex generators.

30. The airplane as recited in claim 1, wherein said supersonic engine means comprises at least two supersonic engines, and one of said supersonic engines and said subsonic engine means are capable of developing adequate thrust for subsonic cruise.

31. The airplane as recited in claim 1, wherein said airplane comprises a wing and fuselage, and said supersonic engine means comprises four engines, mounted two on one side of said fuselage and two on another side of said fuselage.

32. The airplane as recited in claim 1, wherein said subsonic engine means has a bypass ratio at least as great as 4 over 1.

33. The airplane as recited in claim 1, wherein said subsonic engine means is constructed and arranged to function as an auxiliary power unit for ground and/or inflight operation.

34. A method of operating a supersonic airplane designed to be able to fly at supersonic speed and develop adequate thrust for supersonic flight, and yet be able to develop adequate takeoff and climb thrust to enable the airplane to take off and climb and to operate during take off and climb at a noise level no greater than a predetermined noise level, said airplane comprising:

a. providing an airplane comprising:
   i. an aircraft structure capable of operating at supersonic cruise;
   ii. supersonic engine means mounted to said aircraft structure and characterized in that said supersonic engine means is capable of generating said thrust for supersonic cruise so as to maintain supersonic cruise;
   iii. said supersonic engine means being characterized in that with said supersonic engine means operating to develop said take off and climb thrust, said supersonic engine means operates at a noise level greater than aid predetermined noise level, said supersonic engine means being capable of operating at a relatively lesser power setting at a noise level no greater than said predetermined noise level, with said supersonic engine means at said lesser power setting developing a lower thrust that is below said takeoff and climb thrust;
   iv. subsonic engine means having a first nonoperating mode and a second operating mode where said subsonic engine means is capable of providing a boost thrust during takeoff and climb that is at least equal to the difference between the takeoff and climb thrust and the lower thrust developed by the supersonic engine means when operating at a noise level no greater than said predetermined noise level;
   v. said supersonic engine means and said subsonic engine means being characterized in that during takeoff and climb, with said supersonic engine means operating at said lesser power setting, and with said subsonic engine means in said second operating mode, total noise level developed by said supersonic engine means and said subsonic engine means during takeoff and climb is no greater than said predetermined noise level;

b. operating said airplane through takeoff and initial climb by operating said supersonic engine means at said lower thrust, and also operating said subsonic engine means in said second operating mode to develop said boost thrust, so as to cause said airplane to takeoff and go through climb; and c. then operating said airplane at supersonic velocity while having said subsonic engine means in its first nonoperating mode.

* * * * *